(12) United States Patent
Nakagawa et al.

(10) Patent No.: US 10,689,477 B2
(45) Date of Patent: Jun. 23, 2020

(54) POLYISOCYANATE COMPOSITION, POLYURETHANE RESIN, TWO-COMPONENT CURABLE POLYURETHANE COMPOSITION, AND COATING MATERIAL

(71) Applicant: MITSUI CHEMICALS, INC., Tokyo (JP)

(72) Inventors: Toshihiko Nakagawa, Ichihara (JP); Aya Nakagawa, Sodegaura (JP); Shinji Kiyono, Kimitsu (JP); Hirokazu Morita, Chiba (JP); Satoshi Yamasaki, Chiba (JP)

(73) Assignee: MITSUI CHEMICALS, INC., Tokyo (JP)

( * ) Notice: Subject to any disclaimer, the term of this patent is extended or adjusted under 35 U.S.C. 154(b) by 152 days.

(21) Appl. No.: 15/735,047

(22) PCT Filed: Jun. 8, 2016

(86) PCT No.: PCT/JP2016/066996
§ 371 (c)(1),
(2) Date: Dec. 8, 2017

(87) PCT Pub. No.: WO2016/199794
PCT Pub. Date: Dec. 15, 2016

(65) Prior Publication Data
US 2018/0179317 A1    Jun. 28, 2018

(30) Foreign Application Priority Data

Jun. 12, 2015 (JP) ................................ 2015-119353

(51) Int. Cl.
*C08G 18/79* (2006.01)
*C08G 18/09* (2006.01)
(Continued)

(52) U.S. Cl.
CPC .......... *C08G 18/09* (2013.01); *C08G 18/022* (2013.01); *C08G 18/092* (2013.01);
(Continued)

(58) Field of Classification Search
CPC .... C08G 18/72; C08G 18/724; C08G 18/722; C08G 18/7614; C08G 18/7831;
(Continued)

(56) References Cited

U.S. PATENT DOCUMENTS

| | | | |
|---|---|---|---|
| 3,920,644 | A | 11/1975 | Handa et al. |
| 4,864,025 | A | 9/1989 | Robin et al. |

(Continued)

FOREIGN PATENT DOCUMENTS

| | | |
|---|---|---|
| CN | 1473861 A | 2/2004 |
| CN | 1582309 A | 2/2005 |

(Continued)

OTHER PUBLICATIONS

International Search Report from PCT/JP2016/066996 dated Aug. 16, 2016, 4 pages.
(Continued)

*Primary Examiner* — Michael L Leonard
(74) *Attorney, Agent, or Firm* — Rankin, Hill & Clark LLP

(57) ABSTRACT

A polyisocyanate composition contains a modified product of xylylene diisocyanate and a modified product of pentamethylene diisocyanate, and/or a modified product of the xylylene diisocyanate and the pentamethylene diisocyanate. The ratio of the pentamethylene diisocyanate with respect to the total amount of the xylylene diisocyanate and the pentamethylene diisocyanate is 5 mol % or more and 40 mol % or less.

4 Claims, 1 Drawing Sheet

(51) Int. Cl.
*C09D 175/04* (2006.01)
*C08G 18/80* (2006.01)
*C08G 18/76* (2006.01)
*C08G 18/24* (2006.01)
*C08G 18/02* (2006.01)
*C08G 18/18* (2006.01)
*C08G 18/72* (2006.01)
*C08G 18/16* (2006.01)
*C08G 18/62* (2006.01)
*C08G 18/78* (2006.01)
*C08G 18/73* (2006.01)

(52) U.S. Cl.
CPC ......... *C08G 18/161* (2013.01); *C08G 18/168* (2013.01); *C08G 18/1875* (2013.01); *C08G 18/242* (2013.01); *C08G 18/6216* (2013.01); *C08G 18/72* (2013.01); *C08G 18/724* (2013.01); *C08G 18/73* (2013.01); *C08G 18/7642* (2013.01); *C08G 18/7831* (2013.01); *C08G 18/7837* (2013.01); *C08G 18/791* (2013.01); *C08G 18/792* (2013.01); *C08G 18/794* (2013.01); *C08G 18/795* (2013.01); *C08G 18/797* (2013.01); *C08G 18/798* (2013.01); *C08G 18/8019* (2013.01); *C08G 18/8064* (2013.01); *C09D 175/04* (2013.01); *C08G 18/722* (2013.01); *C08G 18/7843* (2013.01)

(58) Field of Classification Search
CPC ............ C08G 18/7837; C08G 18/7843; C08G 18/791; C08G 18/794; C08G 18/797; C08G 18/798
See application file for complete search history.

(56) References Cited

U.S. PATENT DOCUMENTS

| | | | |
|---|---|---|---|
| 5,086,175 A * | 2/1992 | Minato | C08G 18/8064 524/101 |
| 5,354,834 A | 10/1994 | Yoshida et al. | |
| 5,478,897 A | 12/1995 | Teruo | |
| 6,569,533 B1 | 5/2003 | Uchida | |
| 10,081,703 B2 | 9/2018 | Tsukada | |
| 2002/0157789 A1 | 10/2002 | Imai et al. | |
| 2003/0109664 A1 | 6/2003 | Adams et al. | |
| 2003/0207122 A1 | 11/2003 | Uchida et al. | |
| 2003/0229194 A1 | 12/2003 | Nomura et al. | |
| 2007/0009817 A1 | 1/2007 | Kim | |
| 2009/0131603 A1 | 5/2009 | Asahina et al. | |
| 2010/0216905 A1 | 8/2010 | Kuwamura et al. | |
| 2010/0305294 A1 | 12/2010 | Kanayama et al. | |
| 2011/0034660 A1 | 2/2011 | Ryu et al. | |
| 2011/0076621 A1 | 3/2011 | Shimono et al. | |
| 2013/0116357 A1 | 5/2013 | Laas et al. | |
| 2013/0158145 A1 | 6/2013 | Laas et al. | |
| 2013/0158146 A1 | 6/2013 | Greszta-Franz et al. | |
| 2013/0338330 A1 | 12/2013 | Nakagawa et al. | |
| 2015/0158966 A1* | 6/2015 | Laas | C08G 18/73 528/407 |
| 2017/0009002 A1 | 1/2017 | Tsukada et al. | |
| 2018/0162986 A1 | 6/2018 | Nakagawa | |
| 2018/0171065 A1 | 6/2018 | Nakagawa | |
| 2018/0179317 A1 | 6/2018 | Nakagawa | |

FOREIGN PATENT DOCUMENTS

| | | |
|---|---|---|
| CN | 1871272 A | 11/2006 |
| CN | 101608013 A | 12/2009 |
| CN | 101821309 | 9/2010 |
| CN | 103347852 | 10/2013 |
| CN | 104693414 | 6/2015 |
| EP | 3194362 A1 | 7/2017 |
| EP | 3194363 A1 | 7/2017 |
| JP | S49-110684 A | 10/1974 |
| JP | S50-030843 A | 3/1975 |
| JP | S53-52598 A | 5/1978 |
| JP | S54-138586 A | 10/1979 |
| JP | S63-027347 B2 | 6/1988 |
| JP | S63-145273 A | 6/1988 |
| JP | S64043572 A | 2/1989 |
| JP | H01311117 A | 12/1989 |
| JP | H04001278 A | 1/1992 |
| JP | H05117585 A | 5/1993 |
| JP | H06-336573 A | 12/1994 |
| JP | H07-011225 A | 1/1995 |
| JP | H09183826 A | 7/1997 |
| JP | H10039102 A | 2/1998 |
| JP | H10-319202 A | 12/1998 |
| JP | H10-319203 A | 12/1998 |
| JP | H11-171966 A | 6/1999 |
| JP | 3055197 B2 | 6/2000 |
| JP | 2001-098047 A | 4/2001 |
| JP | 2002-020452 A | 1/2002 |
| JP | 2002-249745 A | 9/2002 |
| JP | 2004143275 A | 5/2004 |
| JP | 2008-111072 A | 5/2008 |
| JP | 2010-024386 A | 2/2010 |
| JP | 2010024386 | 2/2010 |
| JP | 2010-121011 | 6/2010 |
| JP | 2010-254764 A | 11/2010 |
| JP | 4672102 B2 | 4/2011 |
| JP | 2011-093314 A | 5/2011 |
| JP | 2011208028 | 10/2011 |
| JP | 2013-060542 A | 4/2013 |
| JP | 5253053 B2 | 7/2013 |
| JP | 2013-531123 A | 8/2013 |
| JP | 2013-532738 A | 8/2013 |
| JP | 2013-534214 A | 9/2013 |
| JP | 2014-058685 | 4/2014 |
| JP | 2014-084342 A | 5/2014 |
| JP | 2015-101625 A | 6/2015 |
| KR | 101822776 B1 | 1/2018 |
| WO | 2007/046470 A1 | 4/2007 |
| WO | 2009/069433 A1 | 6/2009 |
| WO | 2011/016229 A1 | 2/2011 |
| WO | 2012/121291 A1 | 9/2012 |
| WO | 2015/119220 A1 | 8/2015 |
| WO | 2016/042124 A1 | 3/2016 |
| WO | 2016/042125 A1 | 3/2016 |
| WO | 2016199792 A1 | 12/2016 |
| WO | 2016199794 A1 | 12/2016 |
| WO | 2016199795 A1 | 12/2016 |

OTHER PUBLICATIONS

International Search Report from PCT/JP2016/066994 dated Aug. 16, 2016, 4 pages.
International Search Report from PCT/JP2016/066995 dated Jul. 5, 2016, 4 pages.
International Search Report from PCT/JP2016/066997 dated Aug. 16, 2016, 4 pages.
International Preliminary Report on Patentability dated Dec. 21, 2017 filed in PCT/JP2016/066994, total 12 pages.
International Preliminary Report on Patentability dated Dec. 21, 2017 filed in PCT/JP2016/066995, total 11 pages.
International Preliminary Report on Patentability dated Dec. 21, 2017 filed in PCT/JP2016/066996, total 9 pages.
International Preliminary Report on Patentability dated Dec. 21, 2017 filed in PCT/JP2016/066997, total 12 pages.
Extended European Search Report dated Jan. 2, 2019 issued in European patent application No. 16807500.0.
Extended European Search Report dated Jan. 2, 2019 issued in European patent application No. 16807501.8.

* cited by examiner

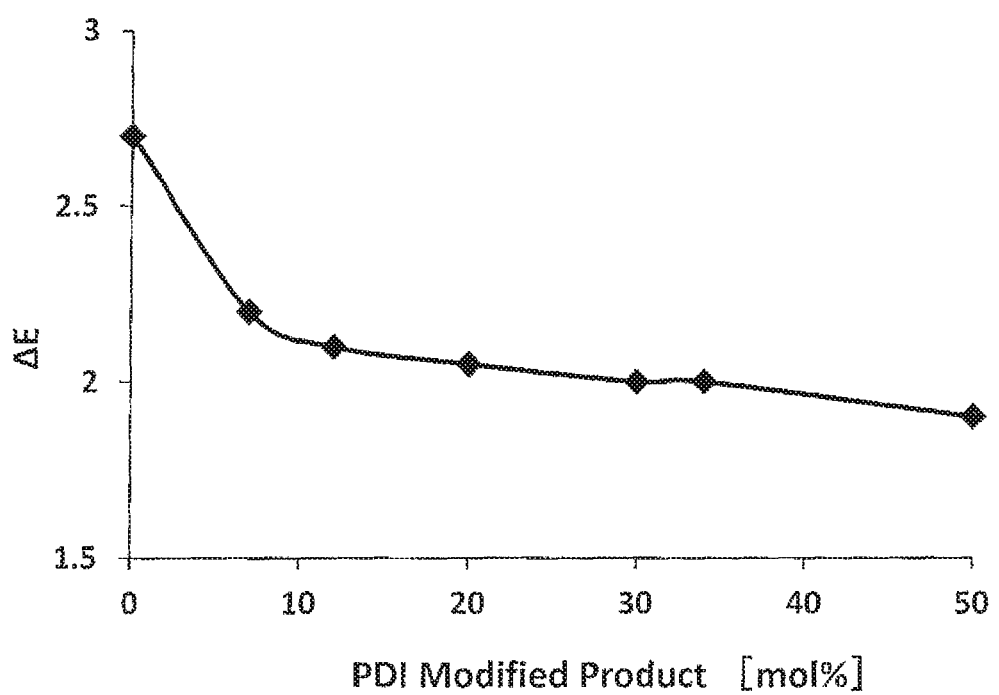

POLYISOCYANATE COMPOSITION, POLYURETHANE RESIN, TWO-COMPONENT CURABLE POLYURETHANE COMPOSITION, AND COATING MATERIAL

TECHNICAL FIELD

The present invention relates to a polyisocyanate composition, a polyurethane resin obtained from the polyisocyanate composition, a two-component curable polyurethane composition containing a polyisocyanate component containing the polyisocyanate composition, and a coating material obtained from the two-component curable polyurethane resin.

BACKGROUND ART

A polyurethane resin is usually produced by reaction of polyisocyanate with an active hydrogen group-containing compound, and is, for example, widely used in various industrial fields such as coating materials, coatings, adhesive materials, pressure-sensitive adhesive materials, and elastomers.

As the polyisocyanate used in the production of the polyurethane resin, for example, xylylene diisocyanate and a derivative thereof, and hexamethylene diisocyanate and a derivative thereof are known. It is also known to use a mixture of them.

The polyisocyanate is, for example, used as curing agents such as coatings and adhesives. To be specific, for example, a curing agent containing a polyol modified product of xylylene diisocyanate of 30 to 90 weight %, and a biuret modified product and/or a trimer of hexamethylene diisocyanate of 10 to 70 weight % is proposed (ref: for example, Patent Document 1).

According to the curing agent, a two-component curable polyurethane composition having excellent adhesion properties, acid resistance/alkali resistance, solvent resistance, contamination resistance, and weather resistance can be obtained.

CITATION LIST

Patent Document

Patent Document 1: Japanese Unexamined Patent Publication No. 2010-24386

SUMMARY OF THE INVENTION

Problem to be Solved by the Invention

Meanwhile, in order to improve the productivity, improvement of the compatibility of the polyisocyanate (curing agent) with the active hydrogen group-containing compound (base component) is demanded in accordance with the usages of the polyurethane resin, and the polyurethane resin to be obtained may also require excellent appearance, durability (weather resistance, chemical resistance), curing properties (fast curing properties), or the like.

An object of the present invention is to provide a polyisocyanate composition capable of obtaining a polyurethane resin having excellent appearance, durability (weather resistance, chemical resistance), and curing properties (fast curing properties) with excellent productivity; a polyurethane resin obtained from the polyisocyanate composition; a two-component curable polyurethane composition containing a polyisocyanate component containing the polyisocyanate composition; and a coating material obtained from the two-component curable polyurethane resin.

Means for Solving the Problem

The present invention [1] includes a polyisocyanate composition containing a modified product of xylylene diisocyanate and a modified product of pentamethylene diisocyanate, and/or a modified product of the xylylene diisocyanate and the pentamethylene diisocyanate, and the ratio of the pentamethylene diisocyanate with respect to the total amount of the xylylene diisocyanate and the pentamethylene diisocyanate is 5 mol % or more and 40 mol % or less.

The present invention [2] includes the polyisocyanate composition described in the above-described [1], wherein the modified product of the xylylene diisocyanate contains a trimer.

The present invention [3] includes the polyisocyanate composition described in the above-described [2], wherein in the modified product of the xylylene diisocyanate, the trimer conversion rate of the xylylene diisocyanate is 5 mass % or more and 45 mass % or less.

The present invention [4] includes the polyisocyanate composition described in any one of the above-described [1] to [3], wherein the modified product of the xylylene diisocyanate is modified with at least alcohols, and in the modified product of the xylylene diisocyanate, the alcohol modification rate is 0.1 mass % or more and 10 mass % or less.

The present invention [5] includes the polyisocyanate composition described in any one of the above-described [1] to [4], wherein the modified product contains at least one functional group selected from the group consisting of the following (a) to (i):
(a) isocyanurate group,
(b) allophanate group,
(c) biuret group,
(d) urethane group,
(e) urea group,
(f) uretdione group,
(g) iminooxadiazinedione group,
(h) uretonimine group, and
(i) carbodiimide group The present invention [6] includes a polyurethane resin obtained from reaction of the polyisocyanate composition described in any one of the above-described [1] to [5] with an active hydrogen group-containing compound.

The present invention [7] includes a two-component curable polyurethane composition containing a polyisocyanate component containing the polyisocyanate composition described in any one of the above-described [1] to [5], and a polyol component.

The present invention [8] includes a coating material obtained from the two-component curable polyurethane composition described in the above-described [7].

Effect of the Invention

According to the polyisocyanate composition of the present invention, the polyurethane resin having excellent appearance, durability (weather resistance, chemical resistance), and curing properties (fast curing properties) can be obtained with excellent productivity.

Also, the polyurethane resin, the two-component curable polyurethane composition, and the coating material of the present invention can be obtained with excellent productivity, and have excellent appearance, durability (weather resistance, chemical resistance), and curing properties (fast curing properties).

BRIEF DESCRIPTION OF THE DRAWINGS

FIG. 1 shows a graph illustrating a relationship of the mole ratio of the pentamethylene diisocyanate modified product with ΔE.

DESCRIPTION OF EMBODIMENTS

A polyisocyanate composition of the present invention contains a modified product of xylylene diisocyanate and a modified product of pentamethylene diisocyanate, and/or a modified product of the xylylene diisocyanate and the pentamethylene diisocyanate.

That is, the polyisocyanate composition of the present invention consists of (1) a modified product of xylylene diisocyanate and a modified product of pentamethylene diisocyanate; (2) only a modified product of xylylene diisocyanate and pentamethylene diisocyanate; or (3) a modified product of xylylene diisocyanate and/or a modified product of pentamethylene diisocyanate, and a modified product of xylylene diisocyanate and pentamethylene diisocyanate.

The polyisocyanate composition consisting of (1) the modified product of the xylylene diisocyanate and the modified product of the pentamethylene diisocyanate is described in detail.

The modified product of the xylylene diisocyanate is a multiple molecular product containing two or more molecules of the xylylene diisocyanate, and can be obtained by modifying the xylylene diisocyanate by a method in accordance with a functional group to be described later.

In the xylylene diisocyanate, 1,2-xylylene diisocyanate (o-xylylene diisocyanate (o-XDI)), 1,3-xylylene diisocyanate (m-xylylene diisocyanate (m-XDI)), and 1,4-xylylene diisocyanate (p-xylylene diisocyanate (p-XDI)) are used as a structural isomer.

These xylylene diisocyanates can be used alone or in combination of two or more. As the xylylene diisocyanate, preferably, 1,3-xylylene diisocyanate and 1,4-xylylene diisocyanate are used, more preferably, 1,3-xylylene diisocyanate is used.

The modified product of the xylylene diisocyante preferably contains at least one functional group selected from the group consisting of the following (a) to (i): (a) isocyanurate group, (b) allophanate group, (c) biuret group, (d) urethane group, (e) urea group, (f) uretdione group, (g) iminooxadiazinedione group, (h) uretonimine group, and (i) carbodiimide group.

The modified product containing the functional group (isocyanurate group) of the above-described (a) is a trimer of the xylylene diisocyanate, and can be, for example, obtained by allowing the xylylene diisocyanate to react under the presence of a known isocyanurate-formation catalyst to be trimerized.

The modified product containing the functional group (allophanate group) of the above-described (b) is an allophanate modified product of the xylylene diisocyanate, and can be, for example, obtained by allowing the xylylene diisocyanate to react with alcohols (described later) to then further react under the presence of a known allophanate-formation catalyst.

The modified product containing the functional group (biuret group) of the above-described (c) is a biuret modified product of the xylylene diisocyanate, and can be, for example, obtained by allowing the xylylene diisocyanate to react with water, tertiary alcohol (for example, t-butyl alcohol or the like), and a secondary amine (for example, dimethylamine, diethylamine, or the like).

The polyisocyanate composition containing the functional group (urethane group) of the above-described (d) is a polyol modified product (polyol derivative) of the xylylene diisocyanate, and can be, for example, obtained by reaction of the xylylene diisocyanate with a polyol component (for example, trihydric alcohols (described later) such as trimethylol propane).

The modified product containing the functional group (urea group) of the above-described (e) is a polyamine modified product of the xylylene diisocyanate, and can be, for example, obtained by reaction of the xylylene diisocyanate with water, a polyamine component, or the like.

The modified product containing the functional group (uretdione group) of the above-described (f) is a uretdione modified product (dimer) of the xylylene diisocyanate, and can be, for example, obtained by allowing the xylylene diisocyanate to react under the presence of a known dimerization-formation catalyst to be dimerized.

The modified product containing the functional group (iminooxadiazinedione group) of the above-described (g) is a trimer of the xylylene diisocyanate, and can be, for example, obtained by allowing the xylylene diisocyanate to react under the presence of a known iminooxadiazinedione-formation catalyst to be trimerized.

The modified product containing the functional group (uretonimine group) of the above-described (h) is a uretonimine modified product of the xylylene diisocyanate, and can be, for example, obtained by reaction of the xylylene diisocyanate with a carbodiimide compound.

The modified product containing the functional group (carbodiimide group) of the above-described (i) is a carbodiimide modified product of the xylylene diisocyanate, and can be, for example, obtained by decarboxylation condensation reaction of the xylylene diisocyanate.

The modified product of the xylylene diisocyanate may contain at least one of the functional group of the above-described (a) to (i), and can also contain two or more functional groups. The modified product is produced by appropriately using the above-described reactions in combination.

As the modified product of the xylylene diisocyanate, preferably, a trimer of the xylylene diisocyanate and a polyol modified product (polyol derivative) of the xylylene diisocyanate are used, more preferably, a trimer of the xylylene diisocyanate is used. In other words, the modified product of the xylylene diisocyanate preferably contains the trimer of the xylylene diisocyanate, more preferably consists of the trimer of the xylylene diisocyanate.

When the trimer of the xylylene diisocyanate is used, a polyurethane resin (described later) having excellent appearance, durability (weather resistance, chemical resistance), and curing properties (fast curing properties) can be obtained with excellent productivity.

The trimer of the xylylene diisocyanate contains a modified product containing the isocyanurate group of the above-described (a) (hereinafter, referred to as an isocyanurate derivative) and a modified product containing the iminooxadiazinedione group of the above-described (g) (hereinafter, referred to as an iminooxadiazinedione derivative).

The isocyanurate derivative and the iminooxadiazinedione derivative are in the relationship of structural isomers, and the isocyanurate derivative is a symmetrical trimer and the iminooxadiazinedione derivative is an asymmetrical trimer.

An iminooxadiazinedione derivative may be produced as a by-product at the time of the production of the isocyanurate derivative, and an isocyanurate derivative may be produced as a by-product at the time of the production of the iminooxadiazinedione derivative.

As described above, the isocyanurate derivative of the xylylene diisocyanate is obtained by subjecting the xylylene diisocyanate to isocyanurate-formation reaction under the presence of an isocyanurate-formation catalyst.

In the present invention, the isocyanurate-formation catalyst is not particularly limited as long as the catalyst activates the isocyanurate-formation reaction. Examples thereof include tertiary amines such as triethylamine, tributylamine, triethylenediamine, and secondary amine copolymer (for example, polycondensate of secondary amine such as dialkylamine, and a monomer copolymerizable with the secondary amine (for example, phenol, formaldehyde, or the like)); Mannich bases such as 2-dimethylaminomethylphenol and 2,4,6-tris(dimethylaminomethyl) phenol; hydroxides of tetraalkylammonium such as tetramethylammonium, tetraethylammonium, tetrabutylammonium, trimethylbenzylammonium, and tributylbenzylammonium or their organic salt of weak acid; hydroxides of trialkylhydroxyalkylammonium such as trimethylhydroxypropylammonium (also known as: N-(2-hydroxypropyl)-N,N,N-trimethylammonium), trimethylhydroxyethylammonium, triethylhydroxypropylammonium, and triethylhydroxyethylammonium or their organic salt of weak acid; metal salts (for example, alkali metal salt, magnesium salt, tin salt, zinc salt, lead salt, or the like) of alkylcarboxylic acid such as acetic acid, caproic acid, octylic acid, myristic acid, and naphthenic acid; metal chelate compounds of β-diketone such as aluminumacetylacetone and lithiumacetylacetone; Friedel-Crafts catalysts such as aluminum chloride and boron trifluoride; various organic metal compounds such as titaniumtetrabutyrate and tributylantimonyoxide; aminosilyl group-containing compounds such as hexamethylsilazane; and halogen-substituted organic phosphorus compounds such as hydrogen difluoride tetrabutylphosphonium.

These isocyanurate-formation catalysts can be used alone or in combination of two or more.

As the isocyanurate-formation catalyst, preferably, hydroxides of tetraalkylammonium and hydroxides of trialkylhydroxyalkylammonium are used, more preferably, hydroxides of tetraalkylammonium are used, further more preferably, hydroxides of trimethylbenzylammonium and hydroxides of tetrabutylammonium are used.

When the above-described catalyst is used as the isocyanurate-formation catalyst, the xylylene diisocyanate can be subjected to isocyanurate-formation reaction at a particularly excellent reaction rate, thereby achieving excellent production efficiency.

The isocyanurate-formation catalyst may be used as a solid content of 100%, or may be diluted in an organic solvent such as alcohol (for example, methanol, isopropyl alcohol, isobutyl alcohol, ethylene glycol, or the like) at an appropriate ratio.

The mixing ratio (solid content) of the isocyanurate-formation catalyst with respect to 100 parts by mass of the xylylene diisocyanate is, for example, 0.001 parts by mass (phr) or more, preferably 0.01 parts by mass (phr) or more, and for example, 0.1 parts by mass (phr) or less, preferably 0.05 parts by mass (phr) or less.

In the method, the isocyanurate-formation catalyst is blended into the xylylene diisocyanate at the above-described mixing ratio to be then heated, so that it is subjected to the isocyanurate-formation reaction.

The reaction conditions of the isocyanurate-formation reaction of the xylylene diisocyanate are as follows: for example, under an inert gas atmosphere such as nitrogen gas under a normal pressure (atmospheric pressure), the reaction temperature (maximum achieving temperature) is, for example, 40° C. or more, preferably 60° C. or more, and for example, 90° C. or less, preferably 80° C. or less, and the reaction time is, for example, 30 minutes or more, preferably 60 minutes or more, and for example, 600 minutes or less, preferably 480 minutes or less.

In the above-described reaction, for example, an organic phosphite or the like described in Japanese Unexamined Patent Publication No. S61-129173 can be also blended as an auxiliary catalyst in order to adjust the isocyanurate-formation reaction.

Examples of the organic phosphite include an aliphatic organic phosphite and an aromatic organic phosphite.

Examples of the aliphatic organic phosphite include alkyl monophosphites such as triethyl phosphite, tributyl phosphite, tris(2-ethylhexyl) phosphite, tridecyl phosphite, trilauryl phosphite, tris(tridecyl) phosphite, and tristearyl phosphite; di-, tri-, or tetra-phosphites derived from aliphatic polyhydric alcohol such as distearyl.pentaerythrityl.diphosphite, didodecyl.pentaerythritol.diphosphite, ditridecyl.pentaerythritol.diphosphite, and tripentaerythritol.triphosphite; furthermore, alicyclic polyphosphites such as hydrogenated bisphenol A phosphite polymer (molecular weight of 2400 to 3000); and tris(2,3-dichloropropyl) phosphites.

Examples of the aromatic organic phosphite include aryl monophosphites such as triphenylphosphite, tris(nonylphenyl) phosphite, tris(2,4-di-t-butylphenyl) phosphite, diphenyldecylphosphite, and diphenyl(tridecyl) phosphite; di-, tri-, or tetra-phosphites derived from aromatic polyhydric alcohol such as dinonylpheyl.pentaerythritol.diphosphite, tetraphenyl.tetratridecyl.pentaerythrityl.tetraphosphite, and tetraphenyl.dipropyleneglycol.diphosphite; and furthermore, diphosphites derived from bisphenol compounds such as dialkyl.bisphenol A.diphosphite having 1 to 20 carbon atoms and 4,4'-butylidene-bis(3-methyl-6-t-butylphenyl-ditridecyl) phosphite.

These organic phosphites can be used alone or in combination of two or more.

As the organic phosphite, preferably, an aromatic organic phosphite is used, more preferably, a di-, tri-, or tetra-phosphite derived from aromatic polyhydric alcohol is used, further more preferably, tetraphenyl.dipropyleneglycol.diphosphite is used.

The mixing ratio of the organic phosphite with respect to 100 parts by mass of the xylylene diisocyanate is, for example, 0.001 parts by mass (phr) or more, preferably 0.005 parts by mass (phr) or more, and for example, 0.05 parts by mass (phr) or less, preferably 0.03 parts by mass (phr) or less.

By blending the above-described organic phosphite at the above-described ratio as an auxiliary catalyst, improvement of the reaction speed and the reaction rate can be achieved, and the gelation can be suppressed.

In the above-described reaction, a stabilizer such as hindered phenol antioxidant including 2,6-di(tert-butyl)-4-methylphenol (also known as: dibutylhydroxytoluene, hereinafter, may be abbreviated as BHT), and IRGANOX 1010, IRGANOX 1076, IRGANOX 1135, and IRGANOX 245 (hereinabove, manufactured by Ciba Japan KK, trade name) can be also added.

The mixing ratio of the stabilizer with respect to 100 parts by mass of the xylylene diisocyanate is, for example, 0.01 parts by mass (phr) or more, preferably 0.02 parts by mass (phr) or more, and for example, 0.05 parts by mass (phr) or less, preferably 0.03 parts by mass (phr) or less.

In the above-described reaction, a known reaction solvent may be blended as needed, and furthermore, a known catalyst deactivator (for example, phosphoric acid, monochloroacetic acid, dodecylbenzenesulfonic acid, paratoluenesulfonic acid, ortho-toluene sulfonic acid, benzoyl chloride, p-toluenesulfonamide, o-toluenesulfonamide, or the like) can be also added at an arbitrary timing.

After the completion of the reaction, the unreacted xylylene diisocyanate can be removed by a known method as needed.

To be specific, after the completion of the above-described isocyanurate-formation reaction, the unreacted xylylene diisocyanate monomer can be removed from an obtained reaction mixture of the isocyanurate derivative of the xylylene diisocyanate and the xylylene diisocyanate monomer by, for example, a known method such as distillation such as thin-film distillation (Smith distillation) and extraction.

In the present invention, when the thin-film distillation is performed after the completion of the isocyanurate-formation reaction of the xylylene diisocyanate, the yield (distillation yield) of the isocyanurate derivative obtained by the thin-film distillation is the mass of the isocyanurate derivative of the xylylene diisocyanate with respect to the mass of the reaction mixture, and is, for example, 10 mass % or more, preferably 25 mass % or more, more preferably 40 mass % or more, and for example, 70 mass % or less, preferably 65 mass % or less, more preferably 60 mass % or less.

The distillation yield of the isocyanurate derivative of the xylylene diisocyanate can be obtained in conformity with Examples to be described later by calculating the ratio of the mass of the isocyanurate derivative of the xylylene diisocyanate with respect to the mass of the reaction mixture.

In the above-described reaction, alcohols can be also blended as needed. That is, the isocyanurate derivative can be modified with the alcohols.

Examples of the alcohols include aliphatic alcohols and aromatic alcohols. Preferably, aliphatic alcohols are used.

Examples of the aliphatic alcohols include monohydric aliphatic alcohols, dihydric aliphatic alcohols, trihydric aliphatic alcohols, and tetrahydric or more aliphatic alcohols.

Examples of the monohydric aliphatic alcohols include straight-chain monohydric aliphatic alcohols and branched monohydric aliphatic alcohols.

Examples of the straight-chain monohydric aliphatic alcohols include methanol, ethanol, n-propanol, n-butanol, n-pentanol, n-hexanol, n-heptanol, n-octanol, n-nonanol, n-decanol, n-undecanol, n-dodecanol (lauryl alcohol), n-tridecanol, n-tetradecanol, n-pentadecanol, n-hexadecanol, n-heptadecanol, n-octadecanol (stearyl alcohol), n-nonadecanol, and eicosanol.

Examples of the branched monohydric aliphatic alcohols include isopropanol (also known as: isopropyl alcohol, IPA), isobutanol (also known as: isobutyl alcohol, IBA), sec-butanol, tert-butanol, isopentanol, isohexanol, isoheptanol, isooctanol, 2-ethylhexanol (also known as: 2-ethylhexyl alcohol, 2-EHA), isononanol, isodecanol, 5-ethyl-2-nonanol, trimethylnonyl alcohol, 2-hexyldecanol, 3,9-diethyl-6-tridecanol, 2-isoheptylisoundecanol, 2-octyldodecanol, and another branched alkanol (C (number of carbon atoms, hereinafter, the same) 5 to 20).

Examples of the dihydric aliphatic alcohols include straight-chain dihydric aliphatic alcohols such as ethylene glycol, 1,3-propanediol (1,3-PG), 1,4-butylene glycol, 1,5-pentanediol, 1,6-hexanediol, 1,4-dihydroxy-2-butene, diethylene glycol, triethylene glycol, dipropylene glycol, and another straight-chain alkane (C7 to 20) diol; branched dihydric aliphatic alcohols such as 1,2-propanediol, 1,3-butylene glycol (also known as: 1,3-butanediol), 1,2-butylene glycol, neopentyl glycol, 3-methyl-1,5-pentanediol (MPD), 2,2,4-trimethyl-1,3-pentanediol (TMPD), 3,3-dimethylolheptane, 2,6-dimethyl-1-octene-3,8-diol, and another branched alkane (C7 to 20) diol; and alicyclic dihydric aliphatic alcohols such as 1,3- or 1,4-cyclohexanedimethanol and a mixture thereof, 1,3- or 1,4-cyclohexanediol and a mixture thereof, and hydrogenated bisphenol A.

Examples of the trihydric aliphatic alcohols include glycerin and trimethylol propane.

Examples of the tetrahydric or more aliphatic alcohols include tetramethylolmethane, D-sorbitol, xylitol, and D-mannitol.

When the alcohols have one or more hydroxy group in its molecule, the molecular structure other than that is not particularly limited as long as excellent effect of the present invention is not inhibited, and for example, the alcohols can have an ester group, an ether group, a cyclohexane ring, and an aromatic ring in its molecule. Examples of the alcohols include an ether group-containing monohydric alcohol which is an addition polymer (random and/or block polymer of two or more alkylene oxides) of the above-described monohydric alcohol and the alkylene oxide (for example, ethylene oxide, propylene oxide, or the like), and an ester group-containing monohydric alcohol which is an addition polymer of the above-described monohydric alcohol and lactone (for example, ε-caprolactone, δ-valerolactone, or the like).

These alcohols can be used alone or in combination of two or more.

As the alcohols, preferably, aliphatic alcohols are used, more preferably, monohydric and dihydric aliphatic alcohols are used, further more preferably, dihydric aliphatic alcohols are used.

As the aliphatic alcohols, preferably, aliphatic alcohols having 1 to 20 carbon atoms are used, more preferably, aliphatic alcohols having 2 to 20 carbon atoms are used, further more preferably, aliphatic alcohols having 2 to 8 carbon atoms are used.

As the aliphatic alcohols, preferably, branched monohydric and dihydric aliphatic alcohols are used, more preferably, branched dihydric aliphatic alcohols are used, particularly preferably, 1,3-butanediol is used.

The alcohols are blended so that the average functionality is two or more in the isocyanurate derivative of the xylylene diisocyanate, and the mixing ratio thereof with respect to 100 parts by mass of the xylylene diisocyanate is, for example, 0.1 parts by mass or more, preferably 1.0 part by mass or more, more preferably 1.5 parts by mass or more, and for example, 10 parts by mass or less, preferably 5.0 parts by mass or less.

In the reaction, the xylylene diisocyanate and the alcohols are blended so that the equivalent ratio (NCO/OH) of the isocyanate group of the xylylene diisocyanate with respect to the hydroxy group of the alcohols is, for example, 5 or more, preferably 10 or more, more preferably 20 or more, and usually 1000 or less, preferably 100 or less, more preferably 50 or less.

Examples of the method for modifying the isocyanurate derivative of the xylylene diisocyanate with the alcohols include a method in which first, the xylylene diisocyanate is allowed to react with the alcohols; next, the isocyanurate-formation reaction is performed under the presence of the isocyanurate-formation catalyst; and thereafter, the unreacted xylylene diisocyanate is removed and a method in which first, only the xylylene diisocyanate is subjected to isocyanurate-formation reaction by the above-described method; then, the unreacted xylylene diisocyanate is removed; and thereafter, the obtained polyisocyanurate is allowed to react with the alcohols.

Preferably, first, the xylylene diisocyanate is allowed to react with the alcohols; next, the isocyanurate-formation reaction is performed under the presence of the isocyanurate-formation catalyst; and thereafter, the unreacted xylylene diisocyanate is removed.

To be specific, in this method, first, the xylylene diisocyanate is mixed with the alcohols to react.

The reaction of the xylylene diisocyanate with the alcohols is the urethane-formation reaction (including allophanate-formation reaction), and the reaction conditions are as follows: for example, under an inert gas atmosphere such as nitrogen gas under a normal pressure (atmospheric pressure), the reaction temperature is, for example, room temperature (for example, 25° C.) or more, preferably 40° C. or more, and for example, 100° C. or less, preferably 90° C. or less, and the reaction time is, for example, 0.05 hours or more, preferably 0.2 hours or more, and for example, 10 hours or less, preferably 6 hours or less, more preferably 3 hours or less.

In the above-described urethane-formation reaction, for example, a known urethane-formation catalyst such as amines and an organic metal compound may be added as needed.

Examples of the amines include tertiary amines such as triethylamine, triethylenediamine, bis-(2-dimethylaminoethyl) ether, and N-methylmorpholine; quaternary ammonium salts such as tetraethylhydroxylammonium; and imidazoles such as imidazole and 2-ethyl-4-methylimidazole.

Examples of the organic metal compound include organic tin compounds such as tin acetate, tin octylate, tin oleate, tin laurate, dibutyltin diacetate, dimethyltin dilaurate, dibutyltin dilaurate, dibutyltin dimercaptide, dibutyltin maleate, dibutyltin dilaurate (dibutyltin (IV) dilaurate), dibutyltin dineodecanoate, dioctyltin dimercaptide, dioctyltin dilaurate, and dibutyltin dichloride; organic lead compounds such as lead octanoate and lead naphthenate; organic nickel compounds such as nickel naphthenate; organic cobalt compounds such as cobalt naphthenate; organic copper compounds such as copper octenoate; and organic bismuth compounds such as bismuth octylate and bismuth neodecanoate.

Furthermore, examples of the urethane-formation catalyst include potassium salts such as potassium carbonate, potassium acetate, and potassium octylate.

These urethane-formation catalysts can be used alone or in combination of two or more.

In the method, the isocyanurate-formation catalyst is blended into the reaction liquid to be obtained at the above-described mixing ratio, and the reaction product of the xylylene diisocyanate and the alcohols is subjected to isocyanurate-formation reaction. The reaction conditions in the isocyanurate-formation reaction are the same as those described above. After the completion of the reaction, the unreacted xylylene diisocyanate is removed by a known removing method such as distillation as needed.

In this manner, the isocyanurate derivative of the xylylene diisocyanate that is modified with the alcohols can be obtained.

For example, when the method in which only the xylylene diisocyanate is subjected to the isocyanurate-formation reaction; then, the unreacted xylylene diisocyanate is removed; and the obtained polyisocyanate is allowed to react with the alcohols (the latter method in the description above) is used, the isocyanurate derivative of the xylylene diisocyanate reacts with the alcohols. The reaction is the urethane-formation reaction, and the reaction is performed under the reaction conditions of the urethane-formation reaction described above.

In this manner, the isocyanurate derivative of the xylylene diisocyanate that is modified with the alcohols can be also produced.

When the isocyanurate derivative of the xylylene diisocyanate is modified with the alcohols, an allophanate derivative of the xylylene diisocyanate may be obtained as a by-product. In this case, the isocyanurate derivative of the xylylene diisocyanate contains the allophanate derivative of the xylylene diisocyanate as an auxiliary component inevitably contained. In other words, when the isocyanurate derivative of the xylylene diisocyanate is modified with the alcohols, an isocyanurate composition containing the isocyanurate derivative of the xylylene diisocyanate and the allophanate derivative of the xylylene diisocyanate is obtained.

In the isocyanurate derivative of the xylylene diisocyanate that is modified with the alcohols, the modification amount (alcohol modification rate of the isocyanurate derivative) of the alcohols with respect to the isocyanurate derivative is, for example, 0.1 mass % or more, preferably 1.0 mass % or more, more preferably 3.0 mass % or more, further more preferably 4.0 mass % or more, and for example, 15 mass % or less, preferably 10 mass % or less, more preferably 6.0 mass % or less.

In the modified product of the xylylene diisocyanate, when the alcohol modification rate is within the above-described range, the polyurethane resin (described later) having excellent appearance, durability (weather resistance, chemical resistance), and curing properties (fast curing properties) can be obtained with excellent productivity.

The modification amount (alcohol modification rate) of the alcohols with respect to the isocyanurate derivative can be calculated by the following formula.

Alcohol Modification Rate (mass %) of Isocyanurate Derivative=(Alcohol Modification Rate (mass %) in Reaction Mixture/Distillation Yield (mass %))×100

The alcohol modification rate in the reaction mixture is the modification amount of the alcohols with respect to the xylylene diisocyanate and the isocyanurate derivative in the reaction mixture, and can be calculated as the mixing ratio of the charged mass of the alcohols with respect to the charged mass of the xylylene diisocyanate.

Generally, the alcohol modification rate can be also calculated by $^1$H-NMR measurement.

As the isocyanurate derivative of the xylylene diisocyanate, any one of the isocyanurate derivative of the xylylene diisocyanate that is not essentially modified with the alcohols and the isocyanurate derivative of the xylylene diisocyanate that is modified with the alcohols may be used.

Preferably, the isocyanurate derivative of the xylylene diisocyanate that is modified with the alcohols is used.

In the present invention, the isocyanurate derivative that is not essentially modified with the alcohols is defined as a derivative that does not intentionally contain an active hydrogen group-containing compound such as the above-described alcohols as a modifier. For example, at the time of the production of the isocyanurate derivative, it is allowed to contain a modified group (for example, urethane group, urea group, or the like) with respect to the isocyanurate derivative based on the active hydrogen group-containing compound (for example, solvent of isocyanurate-formation catalyst (for example, methanol or the like), water, or the like) inevitably mixed (hereinafter, the same).

The concentration of the isocyanate group (solid content of 100 mass %) of an isocyanurate-formation reaction liquid (before distillation) in the isocyanurate derivative of the xylylene diisocyanate is, for example, 10 mass % or more, preferably 15 mass % or more, more preferably 18 mass % or more, and for example, 45 mass % or less, preferably 40 mass % or less, more preferably 35 mass % or less.

The concentration of the isocyanate group (solid content of 100 mass %) in the isocyanurate derivative of the xylylene diisocyanate can be obtained in conformity with Examples to be described later.

In the isocyanurate derivative of the xylylene diisocyanate, the concentration of the isocyanate monomer (concentration of the unreacted xylylene diisocyanate) is, for example, 2 mass % or less, preferably 1 mass % or less, more preferably 0.5 mass % or less.

In the isocyanurate derivative of the xylylene diisocyanate, the conversion rate (reaction rate) of the isocyanate group is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate derivative of the xylylene diisocyanate is not essentially modified with the alcohols, the conversion rate (reaction rate) of the isocyanate group is substantially the same as the isocyanurate conversion rate (trimer conversion rate).

That is, the isocyanurate conversion rate (trimer conversion rate) is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate conversion rate (trimer conversion rate) is within the above-described range, the polyurethane resin (described later) having excellent appearance, durability (weather resistance, chemical resistance), and curing properties (fast curing properties) can be obtained with excellent productivity.

Meanwhile, when the isocyanurate derivative of the xylylene diisocyanate is modified with the alcohols, the conversion rate (reaction rate) of the isocyanate group is the total value of the urethane conversion rate with the alcohols and the isocyanurate conversion rate (trimer conversion rate).

In this case, the urethane conversion rate is, for example, 1 mass % or more, preferably 3 mass % or more, more preferably 5 mass % or more, and for example, 30 mass % or less, preferably 20 mass % or less, more preferably 10 mass % or less.

The isocyanurate conversion rate (trimer conversion rate) is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate conversion rate (trimer conversion rate) is within the above-described range, the polyurethane resin (described later) having excellent appearance, durability (weather resistance, chemical resistance), and curing properties (fast curing properties) can be obtained with excellent productivity.

The conversion rate of the isocyanate group of the xylylene diisocyanate, the urethane conversion rate, and the isocyanurate conversion rate can be obtained in conformity with Examples to be described later by calculating the decreasing rate of the concentration of the isocyanate group in the reaction liquid with respect to the concentration of the isocyanate group of the xylylene diisocyanate at the time of charging.

The modified product of the xylylene diisocyanate may contain phosphorus, when the organic phosphite or the like is used as the auxiliary catalyst.

The concentration of the phosphorus of the modified product (composition) of the xylylene diisocyanate is, for example, 5 ppm or more, preferably 10 ppm or more, and for example, 500 ppm or less, preferably 300 ppm or less.

The modified product of the pentamethylene diisocyanate is a multiple molecular product containing two or more molecules of the pentamethylene diisocyanate, and can be obtained by modifying the pentamethylene diisocyanate by a method in accordance with the functional group to be described later.

Examples of the pentamethylene diisocyanate include 1,5-pentamethylene diisocyanate, 1,4-pentamethylene diisocyanate, and 1,3-pentamethylene diisocyanate.

These pentamethylene diisocyanates can be used alone or in combination of two or more.

As the pentamethylene diisocyanate, preferably, 1,5-pentamethylene diisocyanate is used.

The pentamethylene diisocyanate can be, for example, obtained as a commercially available product, and the pentamethylene diisocyanate can be also produced as follows: pentamethylenediamine or the salt thereof is produced by a known method, for example, a biochemical method (for example, decarboxylation enzyme reaction of lysin and/or salt thereof, or the like), and the pentamethylenediamine or the salt thereof is subjected to isocyanate-formation reaction by a method such as phosgenation method or carbamating method.

The pentamethylene diisocyanate is refined by a known method such as refinement (distillation) and extraction as needed.

The purity of the pentamethylene diisocyanate is, for example, 95 mass % or more, preferably 98 mass % or more, more preferably 99 mass % or more, further more preferably 99.5 mass % or more, particularly preferably 99.9 mass % or more, and usually 100 mass % or less.

The concentration of the hydrolyzable chlorine (hereinafter, may be abbreviated as HC) of the pentamethylene diisocyanate is, for example, 200 ppm or less, preferably 100 ppm or less, more preferably 80 ppm or less, further more preferably 70 ppm or less, and usually 1 ppm or more.

The modified product of the pentamethylene diisocyanate preferably contains at least one functional group selected from the group consisting of the above-described (a) to (i) in the same manner as the modified product of the xylylene diisocyanate described above: (a) isocyanurate group, (b) allophanate group, (c) biuret group, (d) urethane group, (e)

urea group, (f) uretdione group, (g) iminooxadiazinedione group, (h) uretonimine group, and (i) carbodiimide group.

The modified product containing the functional group (isocyanurate group) of the above-described (a) is a trimer of the pentamethylene diisocyanate, and can be, for example, obtained by allowing the pentamethylene diisocyanate to react under the presence of a known isocyanurate-formation catalyst to be trimerized.

The modified product containing the functional group (allophanate group) of the above-described (b) is an allophanate modified product of the pentamethylene diisocyanate, and can be, for example, obtained by allowing the pentamethylene diisocyanate to react with the above-described alcohols to then further react under the presence of a known allophanate-formation catalyst.

The modified product containing the functional group (biuret group) of the above-described (c) is a biuret modified product of the pentamethylene diisocyanate, and can be, for example, obtained by allowing the pentamethylene diisocyanate to react with water, tertiary alcohol (for example, t-butyl alcohol or the like), and a secondary amine (for example, dimethylamine, diethylamine, or the like).

The polyisocyanate composition containing the functional group (urethane group) of the above-described (d) is a polyol modified product (polyol derivative) of the pentamethylene diisocyanate, and can be, for example, obtained by reaction of the pentamethylene diisocyanate with a polyol component (for example, the above-described trihydric alcohols such as trimethylol propane).

The modified product containing the functional group (urea group) of the above-described (e) is a polyamine modified product of the pentamethylene diisocyanate, and can be, for example, obtained by reaction of the pentamethylene diisocyanate with water, a polyamine component, or the like.

The modified product containing the functional group (uretdione group) of the above-described (f) is a uretdione modified product (dimer) of the pentamethylene diisocyanate, and can be, for example, obtained by allowing the pentamethylene diisocyanate to react under the presence of a known dimerization-formation catalyst to be dimerized.

The modified product containing the functional group (iminooxadiazinedione group) of the above-described (g) is a trimer of the pentamethylene diisocyanate, and can be, for example, obtained by allowing the pentamethylene diisocyanate to react under the presence of a known iminooxadiazinedione-formation catalyst to be trimerized.

The modified product containing the functional group (uretonimine group) of the above-described (h) is a uretonimine modified product of the pentamethylene diisocyanate, and can be, for example, obtained by reaction of the pentamethylene diisocyanate with a carbodiimide compound.

The modified product containing the functional group (carbodiimide group) of the above-described (i) is a carbodiimide modified product of the pentamethylene diisocyanate, and can be, for example, obtained by decarboxylation condensation reaction of the pentamethylene diisocyanate.

The modified product of the pentamethylene diisocyanate may contain at least one of the functional group of the above-described (a) to (i), and can also contain two or more functional groups. The modified product is produced by appropriately using the above-described reactions in combination.

As the modified product of the pentamethylene diisocyanate, preferably, a trimer of the pentamethylene diisocyanate is used. In other words, the modified product of the pentamethylene diisocyanate preferably contains the trimer of the pentamethylene diisocyanate, more preferably consists of the trimer of the pentamethylene diisocyanate.

When the trimer of the pentamethylene diisocyanate is used, the polyurethane resin (described later) having excellent appearance, durability (weather resistance, chemical resistance), and curing properties (fast curing properties) can be obtained with excellent productivity.

The trimer of the pentamethylene diisocyanate contains a modified product containing the isocyanurate group of the above-described (a) (isocyanurate derivative) and a modified product containing the iminooxadiazinedione group of the above-described (g) (iminooxadiazinedione derivative).

The isocyanurate derivative and the iminooxadiazinedione derivative are in the relationship of structural isomers, and the isocyanurate derivative is a symmetrical trimer and the iminooxadiazinedione derivative is an asymmetrical trimer.

An iminooxadiazinedione derivative may be produced as a by-product at the time of the production of the isocyanurate derivative, and an isocyanurate derivative may be produced as a by-product at the time of the production of the iminooxadiazinedione derivative.

As the trimer of the pentamethylene diisocyanate, preferably, an isocyanurate derivative is used.

The isocyanurate derivative of the pentamethylene diisocyanate is, for example, obtained by subjecting the above-described pentamethylene diisocyanate to isocyanurate-formation reaction under the presence of an isocyanurate-formation catalyst.

As the isocyanurate-formation catalyst, the isocyanurate-formation catalyst illustrated as the catalyst in the isocyanurate-formation reaction of the xylylene diisocyanate is used.

As the isocyanurate-formation catalyst, preferably, organic salt of weak acid of trialkylhydroxyalkylammonium is used, more preferably, organic salt of weak acid of trimethylhydroxypropylammonium is used.

The mixing ratio (solid content) of the isocyanurate-formation catalyst with respect to 100 parts by mass of the pentamethylene diisocyanate is, for example, 0.001 parts by mass (phr) or more, preferably 0.005 parts by mass (phr) or more, more preferably 0.01 parts by mass (phr) or more, and for example, 0.1 parts by mass (phr) or less, preferably 0.05 parts by mass (phr) or less, more preferably 0.03 parts by mass (phr) or less.

The reaction conditions of the isocyanurate-formation reaction of the pentamethylene diisocyanate are as follows: for example, under an inert gas atmosphere such as nitrogen gas under a normal pressure (atmospheric pressure), the reaction temperature (maximum achieving temperature) is, for example, 40° C. or more, preferably 45° C. or more, and for example, 120° C. or less, preferably 110° C. or less, more preferably 100° C. or less, and the reaction time is, for example, 5 minutes or more, preferably 10 minutes or more, and for example, 180 minutes or less, preferably 120 minutes or less, more preferably 90 minutes or less.

In the above-described reaction, the above-described organic phosphite or the like can be also blended as an auxiliary catalyst in the same manner as the isocyanurate-formation reaction of the xylylene diisocyanate described above.

As the organic phosphite, preferably, an aliphatic organic phosphite is used, more preferably, alkylmonophosphite is used, further more preferably, tris(tridecyl) phosphite is used.

The mixing ratio of the organic phosphite with respect to 100 parts by mass of the pentamethylene diisocyanate is, for example, 0.01 parts by mass (phr) or more, preferably 0.03 parts by mass (phr) or more, and for example, 0.5 parts by mass (phr) or less, preferably 0.3 parts by mass (phr) or less.

The mixing ratio of the organic phosphite with respect to the pentamethylene diisocyanate is, for example, 100 ppm or more, preferably 300 ppm or more, and for example, 5000 ppm or less, preferably 3000 ppm or less.

The addition amount of the organic phosphite with respect to chlorine conversion amount of the hydrolyzable chlorine in the pentamethylene diisocyanate is, for example, 0.5 equivalent or more, preferably 0.7 equivalent or more, and for example, 2 equivalent or less, preferably 1.5 equivalent or less.

By blending the above-described organic phosphite at the above-described ratio as an auxiliary catalyst, improvement of the reaction speed and the reaction rate can be achieved, and the gelation can be suppressed.

In the above-described reaction, a stabilizer such as the hindered phenol antioxidant described above can be also added in the same manner as the isocyanurate-formation reaction of the xylylene diisocyanate.

The mixing ratio of the stabilizer with respect to 100 parts by mass of the pentamethylene diisocyanate is, for example, 0.01 parts by mass (phr) or more, preferably 0.02 parts by mass (phr) or more, and for example, 0.1 parts by mass (phr) or less, preferably 0.08 parts by mass (phr) or less.

In the above-described reaction, a known reaction solvent may be blended as needed, and furthermore, a known catalyst deactivator (for example, phosphoric acid, monochloroacetic acid, dodecylbenzenesulfonic acid, paratoluenesulfonic acid, ortho-toluene sulfonic acid, benzoyl chloride, p-toluenesulfonamide, o-toluenesulfonamide, or the like) can be also added at an arbitrary timing.

After the completion of the reaction, the unreacted pentamethylene diisocyanate can be removed by a known method as needed.

To be specific, after the completion of the above-described isocyanurate-formation reaction, the unreacted pentamethylene diisocyanate monomer can be removed from an obtained reaction mixture of the isocyanurate derivative of the pentamethylene diisocyanate and the pentamethylene diisocyanate monomer by, for example, a known method such as distillation such as thin-film distillation (Smith distillation) and extraction.

In the present invention, when the thin-film distillation is performed after the completion of the isocyanurate-formation reaction of the pentamethylene diisocyanate, the yield (distillation yield) of the isocyanurate derivative obtained by the thin-film distillation is the mass of the isocyanurate derivative of the pentamethylene diisocyanate with respect to the mass of the reaction mixture, and is, for example, 5 mass % or more, preferably 10 mass % or more, more preferably 15 mass % or more, and for example, 70 mass % or less, preferably 65 mass % or less, more preferably 60 mass % or less.

The distillation yield of the isocyanurate derivative of the pentamethylene diisocyanate can be obtained in conformity with Examples to be described later by calculating the ratio of the mass of the isocyanurate derivative of the pentamethylene diisocyanate with respect to the mass of the reaction mixture.

In the above-described reaction, alcohols can be also blended as needed. That is, the isocyanurate derivative can be modified with the alcohols.

As the alcohols, the alcohols illustrated as the alcohols in the isocyanurate-formation reaction of the xylylene diisocyanate are used.

As the alcohols, preferably, aliphatic alcohols are used, more preferably, monohydric to trihydric aliphatic alcohols are used, further more preferably, monohydric aliphatic alcohols are used.

As the aliphatic alcohols, preferably, aliphatic alcohols having 1 to 20 carbon atoms are used, more preferably, aliphatic alcohols having 2 to 20 carbon atoms are used, further more preferably, aliphatic alcohols having 2 to 8 carbon atoms are used.

As the aliphatic alcohols, preferably, branched monohydric aliphatic alcohols, dihydric aliphatic alcohols, and trihydric aliphatic alcohols are used, more preferably, isobutanol (also known as: isobutyl alcohols, IBA), 1,3-butanediol, and trimethylol propane are used, further more preferably, isobutanol (also known as: isobutyl alcohols, IBA) is used.

The alcohols are blended so that the average functionality is two or more in the isocyanurate derivative of the pentamethylene diisocyanate, and the mixing ratio thereof with respect to 100 parts by mass of the pentamethylene diisocyanate is, for example, 0.1 parts by mass or more, preferably 0.2 parts by mass or more, and for example, 10 parts by mass or less, preferably 5.0 parts by mass or less, more preferably 1.0 part by mass or less.

In the reaction, the pentamethylene diisocyanate and the alcohols are blended so that the equivalent ratio (NCO/OH) of the isocyanate group of the pentamethylene diisocyanate with respect to the hydroxy group of the alcohols is, for example, 5 or more, preferably 10 or more, more preferably 20 or more, and usually 1000 or less, preferably 600 or less, more preferably 500 or less.

Examples of the method for modifying the isocyanurate derivative of the pentamethylene diisocyanate with the alcohols include a method in which first, the pentamethylene diisocyanate is allowed to react with the alcohols; next, the isocyanurate-formation reaction is performed under the presence of the isocyanurate-formation catalyst; and thereafter, the unreacted pentamethylene diisocyanate is removed in the same manner as the isocyanurate-formation reaction of the xylylene diisocyanate described above and a method in which first, only the pentamethylene diisocyanate is subjected to isocyanurate-formation reaction by the above-described method; then, the unreacted pentamethylene diisocyanate is removed; and thereafter, the obtained polyisocyanurate is allowed to react with the alcohols.

Preferably, first, the pentamethylene diisocyanate is allowed to react with the alcohols; next, the isocyanurate-formation reaction is performed under the presence of the isocyanurate-formation catalyst; and thereafter, the unreacted pentamethylene diisocyanate is removed.

The reaction of the pentamethylene diisocyanate with the alcohols is the urethane-formation reaction (including allophanate-formation reaction), and the reaction conditions are as follows: for example, under an inert gas atmosphere such as nitrogen gas under a normal pressure (atmospheric pressure), the reaction temperature is, for example, room temperature (for example, 25° C.) or more, preferably 40° C. or more, and for example, 100° C. or less, and the reaction time is, for example, 0.05 hours or more, preferably 0.2 hours or more, and for example, 10 hours or less, preferably 4 hours or less.

In the above-described urethane-formation reaction, for example, the above-described urethane-formation catalyst such as amines and an organic metal compound may be added as needed.

In the method, the isocyanurate-formation catalyst is blended into the reaction liquid to be obtained at the above-described mixing ratio, and the reaction product of the pentamethylene diisocyanate and the alcohols is subjected to isocyanurate-formation reaction. The reaction conditions in the isocyanurate-formation reaction are the same as those described above. After the completion of the reaction, the unreacted pentamethylene diisocyanate is removed by a known removing method such as distillation as needed.

In this manner, the isocyanurate derivative of the pentamethylene diisocyanate that is modified with the alcohols can be obtained.

For example, when the method in which only the pentamethylene diisocyanate is subjected to the isocyanurate-formation reaction; then, the unreacted pentamethylene diisocyanate is removed; and the obtained polyisocyanate is allowed to react with the alcohols (the latter method in the description above) is used, the isocyanurate derivative of the pentamethylene diisocyanate reacts with the alcohols. The reaction is the urethane-formation reaction, and the reaction is performed under the reaction conditions of the urethane-formation reaction described above.

In this manner, the isocyanurate derivative of the pentamethylene diisocyanate that is modified with the alcohols can be also produced.

When the isocyanurate derivative of the pentamethylene diisocyanate is modified with the alcohols, an allophanate derivative of the pentamethylene diisocyanate may be obtained as a by-product. In this case, the isocyanurate derivative of the pentamethylene diisocyanate contains the allophanate derivative of the pentamethylene diisocyanate as an auxiliary component inevitably contained. In other words, when the isocyanurate derivative of the pentamethylene diisocyanate is modified with the alcohols, an isocyanurate composition containing the isocyanurate derivative of the pentamethylene diisocyanate and the allophanate derivative of the pentamethylene diisocyanate is obtained.

In the isocyanurate derivative of the pentamethylene diisocyanate that is modified with the alcohols, the modification amount (alcohol modification rate of the isocyanurate derivative) of the alcohols with respect to the isocyanurate derivative is, for example, 0.01 mass % or more, preferably 0.1 mass % or more, more preferably 1.0 mass % or more, and for example, 35 mass % or less, preferably 30 mass % or less, more preferably 25 mass % or less, further more preferably 20 mass % or less.

In the isocyanurate derivative of the pentamethylene diisocyanate, when the alcohol modification rate is within the above-described range, the polyurethane resin (described later) having excellent appearance, durability (weather resistance, chemical resistance), and curing properties (fast curing properties) can be obtained with excellent productivity.

The modification amount (alcohol modification rate) of the alcohols with respect to the isocyanurate derivative can be obtained by the same calculation formula as that of the alcohol modification rate in the isocyanurate derivative of the xylylene diisocyanate described above.

In the same manner as the description above, the alcohol modification rate can be also calculated by $^1$H-NMR measurement.

As the isocyanurate derivative of the pentamethylene diisocyanate, any one of the isocyanurate derivative of the pentamethylene diisocyanate that is not essentially modified with the alcohols and the isocyanurate derivative of the pentamethylene diisocyanate that is modified with the alcohols may be used. Preferably, the isocyanurate derivative of the pentamethylene diisocyanate that is modified with the alcohols is used.

The concentration of the isocyanate group (solid content of 100 mass %) in the isocyanurate derivative of the pentamethylene diisocyanate is, for example, 10 mass % or more, preferably 15 mass % or more, more preferably 22 mass % or more, and for example, 30 mass % or less, preferably 26 mass % or less.

The concentration of the isocyanate group (solid content of 100 mass %) in the isocyanurate derivative of the pentamethylene diisocyanate can be obtained in conformity with Examples to be described later.

In the isocyanurate derivative of the pentamethylene diisocyanate, the concentration of the isocyanate monomer (concentration of the unreacted pentamethylene diisocyanate) is, for example, 2 mass % or less, preferably 1 mass % or less, more preferably 0.5 mass % or less.

In the isocyanurate derivative of the pentamethylene diisocyanate, the conversion rate (reaction rate) of the isocyanate group is, for example, 5 mass % or more, preferably 7 mass % or more, more preferably 10 mass % or more, and for example, 40 mass % or less, preferably 35 mass % or less, more preferably 30 mass % or less.

When the isocyanurate derivative of the pentamethylene diisocyanate is not essentially modified with the alcohols, the conversion rate (reaction rate) of the isocyanate group is substantially the same as the isocyanurate conversion rate (trimer conversion rate).

That is, the isocyanurate conversion rate (trimer conversion rate) is, for example, 5 mass % or more, preferably 7 mass % or more, more preferably 10 mass % or more, and for example, 40 mass % or less, preferably 35 mass % or less, more preferably 30 mass % or less.

Meanwhile, when the isocyanurate derivative of the pentamethylene diisocyanate is modified with the alcohols, the conversion rate (reaction rate) of the isocyanate group is the total value of the urethane conversion rate with the alcohols and the isocyanurate conversion rate (trimer conversion rate).

In this case, the urethane conversion rate is, for example, 0.1 mass % or more, preferably 0.5 mass % or more, more preferably 1 mass % or more, and for example, 10 mass % or less, preferably 8 mass % or less, more preferably 5 mass % or less.

The isocyanurate conversion rate (trimer conversion rate) is, for example, 5 mass % or more, preferably 7 mass % or more, more preferably 10 mass % or more, and for example, 40 mass % or less, preferably 35 mass % or less, more preferably 30 mass % or less.

The conversion rate of the isocyanate group of the pentamethylene diisocyanate, the urethane conversion rate, and the isocyanurate conversion rate can be obtained in conformity with Examples to be described later by calculating the decreasing rate of the concentration of the isocyanate group in the reaction liquid with respect to the concentration of the isocyanate group of the pentamethylene diisocyanate at the time of charging in the same manner as the xylylene diisocyanate.

The modified product of the pentamethylene diisocyanate may contain phosphorus, when the organic phosphite or the like is used as the auxiliary catalyst.

The concentration of the phosphorus of the modified product (composition) of the pentamethylene diisocyanate is, for example, 5 ppm or more, preferably 10 ppm or more, and for example, 500 ppm or less, preferably 300 ppm or less.

When the polyisocyanate composition consists of the modified product of the xylylene diisocyanate and the modified product of the pentamethylene diisocyanate (that is, in the case of the embodiment of the above-described (1)), the polyisocyanate composition can be obtained by blending and mixing the modified product of the xylylene diisocyanate and the modified product of the pentamethylene diisocyanate by a known method.

In this case, the ratio of each of the components in the polyisocyanate composition is adjusted as the ratio (to be specific, the ratio of the xylylene diisocyanate monomer and the pentamethylene diisocyanate monomer) of the material monomer of each of the components.

To be more specific, the ratio of the xylylene diisocyanate with respect to the total amount (total mol) of the xylylene diisocyanate and the pentamethylene diisocyanate is, for example, 60 mol % or more, preferably 70 mol % or more, more preferably 75 mol % or more, and for example, 95 mol % or less, preferably 90 mol % or less, more preferably 85 mol % or less. Also, the ratio of the pentamethylene diisocyanate with respect to the total amount (total mol) of the xylylene diisocyanate and the pentamethylene diisocyanate is, for example, 5 mol % or more, preferably 10 mol % or more, more preferably 15 mol % or more, and for example, 40 mol % or less, preferably 30 mol % or less, more preferably 25 mol % or less.

When the ratio of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity.

Among all, in view of improvement of the curing properties, the ratio of the xylylene diisocyanate with respect to the total amount (total mol) of the xylylene diisocyanate and the pentamethylene diisocyanate is preferably 85 mol % or more, more preferably 87 mol % or more, and preferably 95 mol % or less, more preferably 93 mol % or less. Also, the ratio of the pentamethylene diisocyanate with respect to the total amount (total mol) of the xylylene diisocyanate and the pentamethylene diisocyanate is preferably 5 mol % or more, more preferably 7 mol % or more, and preferably 15 mol % or less, more preferably 13 mol % or less.

In view of improvement of the weather resistance, the appearance, and the productivity the ratio of the xylylene diisocyanate with respect to the total amount (total mol) of the xylylene diisocyanate and the pentamethylene diisocyanate is preferably 65 mol % or more, more preferably 70 mol % or more, and preferably 85 mol % or less, more preferably 82 mol % or less. Also, the ratio of the pentamethylene diisocyanate with respect to the total amount (total mol) of the xylylene diisocyanate and the pentamethylene diisocyanate is preferably 15 mol % or more, more preferably 18 mol % or more, and preferably 35 mol % or less, more preferably 30 mol % or less. The structure of the composition of the present invention tends to have unpredictably high weather resistance and light resistance in addition to the appearance in the above-described effects regardless of the embodiment particularly containing the xylylene diisocyanate.

The polyisocyanate composition consisting of (2) only the modified product of the xylylene diisocyanate and the pentamethylene diisocyanate is described in detail.

The modified product of the xylylene diisocyanate and the pentamethylene diisocyanate contains the xylylene diisocyanate and the pentamethylene diisocyanate, and is a multiple molecular product containing two or more molecules of them in total.

The modified product of the xylylene diisocyanate and the pentamethylene diisocyanate can be, for example, obtained by mixing the xylylene diisocyanate and the pentamethylene diisocyanate and modifying the obtained mixture by a method in accordance with the functional group to be described later.

That is, the modified product of the xylylene diisocyanate and the pentamethylene diisocyanate is a co-modified product obtained by collectively modifying the xylylene diisocyanate and the pentamethylene diisocyanate.

In the mixture of the xylylene diisocyanate and the pentamethylene diisocyanate, as the ratio of each of the components, the ratio of the xylylene diisocyanate with respect to the total amount (total mol) of the xylylene diisocyanate and the pentamethylene diisocyanate is, for example, 5 mol % or more, preferably 10 mol % or more, more preferably 15 mol % or more, and for example, 40 mol % or less, preferably 30 mol % or less, more preferably 25 mol % or less. Also, the ratio of the pentamethylene diisocyanate with respect to the total amount (total mol) of the xylylene diisocyanate and the pentamethylene diisocyanate is, for example, 60 mol % or more, preferably 70 mol % or more, more preferably 75 mol % or more, and, for example, 95 mol % or less, preferably 90 mol % or less, more preferably 85 mol % or less.

When the ratio of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity.

The modified product of the xylylene diisocyanate and the pentamethylene diisocyanate preferably contains at least one functional group selected from the group consisting of the above-described (a) to (i) in the same manner as the modified product of the xylylene diisocyanate described above: (a) isocyanurate group, (b) allophanate group, (c) biuret group, (d) urethane group, (e) urea group, (f) uretdione group, (g) iminooxadiazinedione group, (h) uretonimine group, and (i) carbodiimide group.

The modified product containing the functional group (isocyanurate group) of the above-described (a) is a cotrimer of the mixture of the xylylene diisocyanate and the pentamethylene diisocyanate, and can be, for example, obtained by allowing the mixture of the xylylene diisocyanate and the pentamethylene diisocyanate to react under the presence of a known isocyanurate-formation catalyst to be trimerized.

The modified product containing the functional group (allophanate group) of the above-described (b) is an allophanate modified product of the mixture of the xylylene diisocyanate and the pentamethylene diisocyanate, and can be, for example, obtained by allowing the mixture of the xylylene diisocyanate and the pentamethylene diisocyanate to react with the above-described alcohols to then further react under the presence of a known allophanate-formation catalyst.

The modified product containing the functional group (biuret group) of the above-described (c) is a biuret modified product of the mixture of the xylylene diisocyanate and the pentamethylene diisocyanate, and can be, for example, obtained by allowing the mixture of the xylylene diisocyanate and the pentamethylene diisocyanate to react with water, tertiary alcohol (for example, t-butyl alcohol or the like), and a secondary amine (for example, dimethylamine, diethylamine, or the like).

The polyisocyanate composition containing the functional group (urethane group) of the above-described (d) is a polyol modified product (polyol derivative) of the mixture of the xylylene diisocyanate and the pentamethylene diisocyanate, and can be, for example, obtained by reaction of the mixture of the xylylene diisocyanate and the pentamethylene diisocyanate with a polyol component (for example, the above-described trihydric alcohols such as trimethylol propane).

The modified product containing the functional group (urea group) of the above-described (e) is a polyamine modified product of the mixture of the xylylene diisocyanate and the pentamethylene diisocyanate, and can be, for example, obtained by reaction of the mixture of the xylylene diisocyanate and the pentamethylene diisocyanate with water, a polyamine component, or the like.

The modified product containing the functional group (uretdione group) of the above-described (f) is a uretdione modified product (dimer) of the mixture of the xylylene diisocyanate and the pentamethylene diisocyanate, and can be, for example, obtained by allowing the mixture of the xylylene diisocyanate and the pentamethylene diisocyanate to react under the presence of a known dimerization-formation catalyst to be dimerized.

The modified product containing the functional group (iminooxadiazinedione group) of the above-described (g) is a cotrimer of the mixture of the xylylene diisocyanate and the pentamethylene diisocyanate, and can be, for example, obtained by allowing the mixture of the xylylene diisocyanate and the pentamethylene diisocyanate to react under the presence of a known iminooxadiazinedione-formation catalyst to be trimerized.

The modified product containing the functional group (uretonimine group) of the above-described (h) is a uretonimine modified product of the mixture of the xylylene diisocyanate and the pentamethylene diisocyanate, and can be, for example, obtained by reaction of the mixture of the xylylene diisocyanate and the pentamethylene diisocyanate with a carbodiimide compound.

The modified product containing the functional group (carbodiimide group) of the above-described (i) is a carbodiimide modified product of the mixture of the xylylene diisocyanate and the pentamethylene diisocyanate, and can be, for example, obtained by decarboxylation condensation reaction of the mixture of the xylylene diisocyanate and the pentamethylene diisocyanate.

The modified product of the xylylene diisocyanate and the pentamethylene diisocyanate may contain at least one of the functional group of the above-described (a) to (i), and can also contain two or more functional groups. The modified product is produced by appropriately using the above-described reactions in combination.

As the modified product of the xylylene diisocyanate and the pentamethylene diisocyanate, preferably, a cotrimer of the mixture of the xylylene diisocyanate and the pentamethylene diisocyanate is used. In other words, the modified product of the xylylene diisocyanate and the pentamethylene diisocyanate preferably contains the cotrimer of the mixture of the xylylene diisocyanate and the pentamethylene diisocyanate, more preferably consists of the cotrimer of the mixture of the xylylene diisocyanate and the pentamethylene diisocyanate.

When the cotrimer of the mixture of the xylylene diisocyanate and the pentamethylene diisocyanate is used, the polyurethane resin (described later) having excellent appearance, durability (weather resistance, chemical resistance), and curing properties (fast curing properties) can be obtained with excellent productivity.

The cotrimer of the mixture of the xylylene diisocyanate and the pentamethylene diisocyanate contains a modified product containing the isocyanurate group of the above-described (a) (isocyanurate derivative) and a modified product containing the iminooxadiazinedione group of the above-described (g) (iminooxadiazinedione derivative).

The isocyanurate derivative and the iminooxadiazinedione derivative are in the relationship of structural isomers, and the isocyanurate derivative is a symmetrical trimer and the iminooxadiazinedione derivative is an asymmetrical trimer.

An iminooxadiazinedione derivative may be produced as a by-product at the time of the production of the isocyanurate derivative, and an isocyanurate derivative may be produced as a by-product at the time of the production of the iminooxadiazinedione derivative.

As the cotrimer of the mixture of the xylylene diisocyanate and the pentamethylene diisocyanate, preferably, an isocyanurate derivative of the xylylene diisocyanate and the pentamethylene diisocyanate is used.

The isocyanurate derivative of the xylylene diisocyanate and the pentamethylene diisocyanate is, for example, obtained by subjecting the above-described mixture of the xylylene diisocyanate and the pentamethylene diisocyanate to isocyanurate-formation reaction under the presence of an isocyanurate-formation catalyst.

As the isocyanurate-formation catalyst, the isocyanurate-formation catalyst illustrated as the catalyst in the isocyanurate-formation reaction of the xylylene diisocyanate is used.

As the isocyanurate-formation catalyst, preferably, organic salt of weak acid of trialkylhydroxyalkylammonium is used, more preferably, organic salt of weak acid of trimethylhydroxypropylammonium is used.

The mixing ratio (solid content) of the isocyanurate-formation catalyst with respect to 100 parts by mass of the mixture of the xylylene diisocyanate and the pentamethylene diisocyanate is, for example, 0.001 parts by mass (phr) or more, preferably 0.003 parts by mass (phr) or more, and for example, 0.05 parts by mass (phr) or less, preferably 0.03 parts by mass (phr) or less.

The reaction conditions of the isocyanurate-formation reaction of the mixture of the xylylene diisocyanate and the pentamethylene diisocyanate are as follows: for example, under an inert gas atmosphere such as nitrogen gas under a normal pressure (atmospheric pressure), the reaction temperature (maximum achieving temperature) is, for example, 40° C. or more, preferably 60° C. or more, and for example, 90° C. or less, preferably 80° C. or less, and the reaction time is, for example, 30 minutes or more, preferably 60 minutes or more, and for example, 600 minutes or less, preferably 480 minutes or less.

In the above-described reaction, the above-described organic phosphite or the like can be also blended as an auxiliary catalyst in the same manner as the isocyanurate-formation reaction of the xylylene diisocyanate described above.

As the organic phosphite, preferably, an aromatic organic phosphite is used, more preferably, di-, tri-, or tetra-phosphites derived from aromatic polyhydric alcohol are used, further more preferably, tetraphenyl.dipropyleneglycol.diphosphite is used.

The mixing ratio of the organic phosphite with respect to 100 parts by mass of the mixture of the xylylene diisocyanate and the pentamethylene diisocyanate is, for example, 0.001 parts by mass (phr) or more, preferably 0.005 parts by mass (phr) or more, and for example, 0.05 parts by mass (phr) or less, preferably 0.03 parts by mass (phr) or less.

By blending the above-described organic phosphite as an auxiliary catalyst, improvement of the reaction speed and the reaction rate can be achieved, and the gelation can be suppressed.

In the above-described reaction, a stabilizer such as the hindered phenol antioxidant described above can be also added in the same manner as the isocyanurate-formation reaction of the xylylene diisocyanate.

The mixing ratio of the stabilizer with respect to 100 parts by mass of the mixture of the xylylene diisocyanate and the pentamethylene diisocyanate is, for example, 0.001 parts by mass (phr) or more, preferably 0.002 parts by mass (phr) or more, and for example, 0.02 parts by mass (phr) or less, preferably 0.01 parts by mass (phr) or less.

In the above-described reaction, a known reaction solvent may be blended as needed, and furthermore, a known catalyst deactivator (for example, phosphoric acid, monochloroacetic acid, dodecylbenzenesulfonic acid, paratoluenesulfonic acid, ortho-toluene sulfonic acid, benzoyl chloride, p-toluenesulfonamide, o-toluenesulfonamide, or the like) can be also added at an arbitrary timing.

After the completion of the reaction, the unreacted xylylene diisocyanate and the unreacted pentamethylene diisocyanate can be removed by a known method as needed.

To be specific, after the completion of the above-described isocyanurate-formation reaction, the unreacted xylylene diisocyanate monomer and the unreacted pentamethylene diisocyanate monomer can be removed from an obtained reaction mixture of the isocyanurate derivative, the xylylene diisocyanate monomer, and the pentamethylene diisocyanate monomer by, for example, a known method such as distillation such as thin-film distillation (Smith distillation) and extraction.

In the present invention, when the thin-film distillation is performed after the completion of the isocyanurate-formation reaction, the yield (distillation yield) of the isocyanurate derivative obtained by the thin-film distillation is the mass of the isocyanurate derivative of the xylylene diisocyanate and the pentamethylene diisocyanate with respect to the mass of the reaction mixture, and is, for example, 5 mass % or more, preferably 10 mass % or more, more preferably 15 mass % or more, and for example, 70 mass % or less, preferably 64 mass % or less, more preferably 60 mass % or less.

The distillation yield of the isocyanurate derivative of the xylylene diisocyanate and the pentamethylene diisocyanate can be obtained in conformity with Examples to be described later by calculating the ratio of the mass of the isocyanurate derivative of the xylylene diisocyanate and the pentamethylene diisocyanate with respect to the mass of the reaction mixture.

In the above-described reaction, alcohols can be also blended as needed. That is, the isocyanurate derivative can be modified with the alcohols.

As the alcohols, the alcohols illustrated as the alcohols in the isocyanurate-formation reaction of the xylylene diisocyanate are used.

As the alcohols, preferably, aliphatic alcohols are used, more preferably, monohydric and dihydric aliphatic alcohols are used, further more preferably, monohydric aliphatic alcohols are used.

As the aliphatic alcohols, preferably, aliphatic alcohols having 1 to 20 carbon atoms are used, more preferably, aliphatic alcohols having 2 to 20 carbon atoms are used, further more preferably, aliphatic alcohols having 2 to 8 carbon atoms are used.

As the aliphatic alcohols, preferably, branched monohydric and dihydric aliphatic alcohols are used, more preferably, branched monohydric aliphatic alcohols are used, particularly preferably, isobutanol (also known as: isobutyl alcohol, IBA) is used.

The alcohols are blended so that the average functionality is two or more in the isocyanurate derivative of the xylylene diisocyanate and the pentamethylene diisocyanate, and the mixing ratio thereof with respect to 100 parts by mass of the mixture of the xylylene diisocyanate and the pentamethylene diisocyanate is, for example, 0.1 parts by mass or more, preferably 1.0 part by mass or more, and for example, 10 parts by mass or less, preferably 8.0 parts by mass or less.

In the reaction, the mixture of the xylylene diisocyanate and the pentamethylene diisocyanate, and the alcohols are blended so that the equivalent ratio (NCO/OH) of the isocyanate group (total amount) of the xylylene diisocyanate and the pentamethylene diisocyanate with respect to the hydroxy group of the alcohols is, for example, 5 or more, preferably 10 or more, more preferably 20 or more, and usually 1000 or less, preferably 600 or less, more preferably 100 or less.

Examples of the method for modifying the isocyanurate derivative of the xylylene diisocyanate and the pentamethylene diisocyanate with the alcohols include a method in which first, the mixture of the xylylene diisocyanate and the pentamethylene diisocyanate is allowed to react with the alcohols; next, the isocyanurate-formation reaction is performed under the presence of the isocyanurate-formation catalyst; and thereafter, the unreacted xylylene diisocyanate and the unreacted pentamethylene diisocyanate are removed in the same manner as the isocyanurate-formation reaction of the xylylene diisocyanate described above, a method in which first, only one of the xylylene diisocyanate or the pentamethylene diisocyanate is allowed to react with the alcohols; next the other isocyanate is blended therein; then, the isocyanurate-formation reaction is performed under the presence of the isocyanurate-formation catalyst; and thereafter, the unreacted xylylene diisocyanate and the unreacted pentamethylene diisocyanate are removed, and a method in which first, only the mixture of the xylylene diisocyanate and the pentamethylene diisocyanate is subjected to isocyanurate-formation reaction by the above-described method; then, the unreacted xylylene diisocyanate and the unreacted pentamethylene diisocyanate are removed; and thereafter, the obtained polyisocyanurate is allowed to react with the alcohols.

Preferably, first, the mixture of the xylylene diisocyanate and the pentamethylene diisocyanate is allowed to react with the alcohols; next, the isocyanurate-formation reaction is performed under the presence of the isocyanurate-formation catalyst; and thereafter, the unreacted xylylene diisocyanate and the unreacted pentamethylene diisocyanate are removed.

The reaction of the mixture of the xylylene diisocyanate and the pentamethylene diisocyanate with the alcohols is the urethane-formation reaction (including allophanate-formation reaction), and the reaction conditions are as follows: for example, under an inert gas atmosphere such as nitrogen gas under a normal pressure (atmospheric pressure), the reaction temperature is, for example, room temperature (for example, 25° C.) or more, preferably 40° C. or more, and for example, 100° C. or less, preferably 90° C. or less, and the reaction time is, for example, 0.05 hours or more, preferably 0.2 hours or more, and for example, 10 hours or less, preferably 6 hours or less, more preferably 3 hours or less.

In the above-described urethane-formation reaction, for example, the above-described urethane-formation catalyst such as amines and an organic metal compound may be added as needed.

In the method, the isocyanurate-formation catalyst is blended into the reaction liquid to be obtained at the above-described mixing ratio, and the reaction product of the mixture of the xylylene diisocyanate and the pentamethylene diisocyanate, and the alcohols is subjected to isocyanurate-formation reaction. The reaction conditions in the isocyanurate-formation reaction are the same as those described above. After the completion of the reaction, the unreacted xylylene diisocyanate and the unreacted pentamethylene diisocyanate are removed by a known removing method such as distillation as needed.

In this manner, the isocyanurate derivative of the xylylene diisocyanate and the pentamethylene diisocyanate that is modified with the alcohols can be obtained.

For example, when the method in which only the mixture of the xylylene diisocyanate and the pentamethylene diisocyanate is subjected to isocyanurate-formation reaction; then, the unreacted xylylene diisocyanate and the unreacted pentamethylene diisocyanate are removed; and thereafter, the obtained polyisocyanate is allowed to react with the alcohols (the latter method in the description above) is used, the isocyanurate derivative of the xylylene diisocyanate and the pentamethylene diisocyanate reacts with the alcohols. The reaction is the urethane-formation reaction, and the reaction is performed under the reaction conditions of the urethane-formation reaction described above.

In this manner, the isocyanurate derivative of the xylylene diisocyanate and the pentamethylene diisocyanate that is modified with the alcohols can be also produced.

When the isocyanurate derivative of the xylylene diisocyanate and the pentamethylene diisocyanate is modified with the alcohols, an allophanate derivative of the xylylene diisocyanate and the pentamethylene diisocyanate may be obtained as a by-product. In this case, the isocyanurate derivative of the xylylene diisocyanate and the pentamethylene diisocyanate contains the allophanate derivative of the xylylene diisocyanate and the pentamethylene diisocyanate as an auxiliary component inevitably contained. In other words, when the isocyanurate derivative of the xylylene diisocyanate and the pentamethylene diisocyanate is modified with the alcohols, an isocyanurate composition containing the isocyanurate derivative of the xylylene diisocyanate and the pentamethylene diisocyanate, and the allophanate derivative of the xylylene diisocyanate and the pentamethylene diisocyanate is obtained.

In the isocyanurate derivative of the xylylene diisocyanate and the pentamethylene diisocyanate that is modified with the alcohols, the modification amount (alcohol modification rate of the isocyanurate derivative) of the alcohols with respect to the isocyanurate derivative is, for example, 0.1 mass % or more, preferably 1.0 mass % or more, more preferably 3.0 mass % or more, further more preferably 4.0 mass % or more, and for example, 15 mass % or less, preferably 10 mass % or less, more preferably 7.0 mass % or less.

The modification amount (alcohol modification rate) of the alcohols with respect to the isocyanurate derivative can be obtained by the same calculation formula as that of the alcohol modification rate in the isocyanurate derivative of the xylylene diisocyanate described above.

In the same manner as the description above, the alcohol modification rate can be also calculated by $^1$H-NMR measurement.

As the isocyanurate derivative of the xylylene diisocyanate and the pentamethylene diisocyanate, any one of the isocyanurate derivative of the xylylene diisocyanate and the pentamethylene diisocyanate that is not essentially modified with the alcohols and the isocyanurate derivative of the xylylene diisocyanate and the pentamethylene diisocyanate that is modified with the alcohols may be used. Preferably, the isocyanurate derivative of the xylylene diisocyanate and the pentamethylene diisocyanate that is modified with the alcohols is used.

As the ratio of the xylylene diisocyanate and the pentamethylene diisocyanate that are contained in the isocyanurate derivative of the xylylene diisocyanate and the pentamethylene diisocyanate, the ratio of the xylylene diisocyanate with respect to the total amount (total mol) of the xylylene diisocyanate and the pentamethylene diisocyanate is, for example, 60 mol % or more, preferably 70 mol % or more, more preferably 75 mol % or more, and for example, 95 mol % or less, preferably 90 mol % or less, more preferably 85 mol % or less. The ratio of the pentamethylene diisocyanate with respect to the total amount (total mol) of the xylylene diisocyanate and the pentamethylene diisocyanate is, for example, 5 mol % or more, preferably 10 mol % or more, more preferably 15 mol % or more, and for example, 40 mol % or less, preferably 30 mol % or less, more preferably 25 mol % or less.

When the ratio of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity. The structure of the composition of the present invention tends to have unpredictably high weather resistance and light resistance in addition to the appearance in the above-described effects regardless of the embodiment particularly containing the xylylene diisocyanate.

The ratio of the xylylene diisocyanate and the pentamethylene diisocyanate contained in the isocyanurate derivative of the xylylene diisocyanate and the pentamethylene diisocyanate can be obtained by producing the isocyanurate derivative as described above and then, measuring the amount of the unreacted monomer by GCMS analysis (mass analysis) to be subtracted from the charged amount in conformity with Examples to be described later.

The concentration of the isocyanate group (solid content of 100 mass %) of the isocyanurate-formation reaction liquid (before distillation) in the isocyanurate derivative of the xylylene diisocyanate and the pentamethylene diisocyanate is, for example, 20 mass % or more, preferably 25 mass % or more, more preferably 30 mass % or more, and for example, 50 mass % or less, preferably 45 mass % or less.

The concentration of the isocyanate group (solid content of 100 mass %) in the isocyanurate derivative of the xylylene diisocyanate and the pentamethylene diisocyanate can be obtained in conformity with Examples to be described later.

In the isocyanurate derivative of the xylylene diisocyanate and the pentamethylene diisocyanate, the concentration of the isocyanate monomer (concentration of the unreacted xylylene diisocyanate and the unreacted pentamethylene diisocyanate) is, for example, 2 mass % or less, preferably 1 mass % or less, more preferably 0.5 mass % or less.

In the isocyanurate derivative of the xylylene diisocyanate and the pentamethylene diisocyanate, the conversion rate (reaction rate) of the isocyanate group is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate derivative of the xylylene diisocyanate and the pentamethylene diisocyanate is not essentially modified with the alcohols, the conversion rate (reaction rate) of the isocyanate group is substantially the same as the isocyanurate conversion rate (trimer conversion rate).

That is, the isocyanurate conversion rate (trimer conversion rate) is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate conversion rate (trimer conversion rate) is within the above-described range, the polyurethane resin (described later) having excellent appearance, durability (weather resistance, chemical resistance), and curing properties (fast curing properties) can be obtained with excellent productivity.

Meanwhile, when the isocyanurate derivative of the xylylene diisocyanate and the pentamethylene diisocyanate is modified with the alcohols, the conversion rate (reaction rate) of the isocyanate group is the total value of the urethane conversion rate with the alcohols and the isocyanurate conversion rate (trimer conversion rate).

In this case, the urethane conversion rate is, for example, 1 mass % or more, preferably 2 mass % or more, more preferably 3 mass % or more, and for example, 10 mass % or less, preferably 8 mass % or less, more preferably 5 mass % or less.

The isocyanurate conversion rate (trimer conversion rate) is, for example, 5 mass % or more, preferably 10 mass % or more, more preferably 15 mass % or more, and for example, 50 mass % or less, preferably 45 mass % or less, more preferably 40 mass % or less, further more preferably 35 mass % or less.

When the isocyanurate conversion rate (trimer conversion rate) is within the above-described range, the polyurethane resin (described later) having excellent appearance, durability (weather resistance, chemical resistance), and curing properties (fast curing properties) can be obtained with excellent productivity.

The conversion rate of the isocyanate group, the urethane conversion rate, and the isocyanurate conversion rate can be obtained in conformity with Examples to be described later by calculating the decreasing rate of the concentration of the isocyanate group in the reaction liquid with respect to the concentration of the isocyanate group of the xylylene diisocyanate and the pentamethylene diisocyanate at the time of charging in the same manner as the xylylene diisocyanate.

The modified product of the xylylene diisocyanate and the pentamethylene diisocyanate may contain phosphorus, when the organic phosphite or the like is used as the auxiliary catalyst.

The concentration of the phosphorus of the modified product (composition) of the xylylene diisocyanate and the pentamethylene diisocyanate is, for example, 5 ppm or more, preferably 10 ppm or more, and for example, 500 ppm or less, preferably 300 ppm or less.

In the polyisocyanate composition, the ratio of the xylylene diisocyanate and the pentamethylene diisocyanate is within the above-described range, so that the polyurethane resin (described later) having excellent appearance, durability (weather resistance, chemical resistance), and curing properties (fast curing properties) can be obtained with excellent productivity.

In the description above, the method in which the xylylene diisocyanate and the pentamethylene diisocyanate are mixed, and the obtained mixture is modified is described. Alternatively, for example, without being mixed in advance, the xylylene diisocyanate, the pentamethylene diisocyanate, and various catalysts are collectively blended to react, so that the modified product of the xylylene diisocyanate and the pentamethylene diisocyanate can be also obtained.

The polyisocyanate composition consisting of (3) the modified product of the xylylene diisocyanate and/or the modified product of the pentamethylene diisocyanate, and the modified product of the xylylene diisocyanate and the pentamethylene diisocyanate is described in detail.

The polyisocyanate composition can contain the modified product of the xylylene diisocyanate described above and/or the modified product of the pentamethylene diisocyanate described above, and the modified product of the xylylene diisocyanate and the pentamethylene diisocyanate described above.

The polyisocyanate composition can be, for example, obtained by blending and mixing the modified product of the xylylene diisocyanate described above and/or the modified product of the pentamethylene diisocyanate described above and the modified product of the xylylene diisocyanate and the pentamethylene diisocyanate described above by a known method.

In this case, the mixing ratio of each of the components is adjusted as the ratio (to be specific, the ratio of the xylylene diisocyanate monomer and the pentamethylene diisocyanate monomer) of the material monomer of each of the components.

To be more specific, the ratio of the xylylene diisocyanate with respect to the total amount (total mol) of the xylylene diisocyanate and the pentamethylene diisocyanate is, for example, 60 mol % or more, preferably 70 mol % or more, more preferably 75 mol % or more, and for example, 95 mol % or less, preferably 90 mol % or less, more preferably 85 mol % or less. Also, the ratio of the pentamethylene diisocyanate with respect to the total amount (total mol) of the xylylene diisocyanate and the pentamethylene diisocyanate is, for example, 5 mol % or more, preferably 10 mol % or more, more preferably 15 mol % or more, and, for example, 40 mol % or less, preferably 30 mol % or less, more preferably 25 mol % or less.

When the ratio of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity. The structure of the composition of the present invention tends to have unpredictably high weather resistance and light resistance in addition to the appearance in the above-described effects regardless of the embodiment particularly containing the xylylene diisocyanate.

The polyisocyanate composition (polyisocyanate composition consisting of the modified product of the xylylene diisocyanate, the modified product of the pentamethylene diisocyanate, and the modified product of the xylylene diisocyanate and the pentamethylene diisocyanate) of the embodiment of the above-described (3) can be also produced by, for example, excessively blending the xylylene diisocyanate or the pentamethylene diisocyanate in the production of the modified product of the xylylene diisocyanate and the pentamethylene diisocyanate described above.

That is, at the time of the production of the modified product of the xylylene diisocyanate and the pentamethylene diisocyanate described above, when the xylylene diisocyanate or the pentamethylene diisocyanate is excessively blended, first, the xylylene diisocyanate and the pentamethylene diisocyanate are collectively modified, so that the modified product of the xylylene diisocyanate and the pentamethylene diisocyanate is obtained. Thereafter, excessive (that is, free) xylylene diisocyanate or pentamethylene diisocyanate is modified, so that the modified product of the xylylene diisocyanate or the modified product of the pentamethylene diisocyanate is obtained.

In this case, the mixing ratio of the xylylene diisocyanate and the pentamethylene diisocyanate is adjusted within the above-described range.

In the polyisocyanate composition, the content ratio of the modified product of the xylylene diisocyanate and the pentamethylene diisocyanate is, for example, 1 mass % or more, preferably 5 mass % or more, more preferably 10 mass % or more, and for example, 99 mass % or less, preferably 95 mass % or less, more preferably 90 mass % or less.

When the content ratio of the modified product of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity.

As the polyisocyanate composition, any one of the polyisocyanate compositions of the above-described (1) to (3) may be used. Preferably, the polyisocyanate composition of the embodiment of the above-described (1) is used.

That is, the polyisocyanate composition preferably consists of the modified product of the xylylene diisocyanate and the modified product of the pentamethylene diisocyanate.

When the polyisocyanate composition of the above-described (1) is used, the polyurethane resin (described later) having excellent appearance, durability (weather resistance, chemical resistance), and curing properties (fast curing properties) can be obtained with excellent productivity.

In the polyisocyanate composition, as the ratio of the xylylene diisocyanate and the pentamethylene diisocyanate, the ratio of the xylylene diisocyanate is, for example, 60 mol % or more, preferably 70 mol % or more, more preferably 75 mol % or more, and for example, 95 mol % or less, preferably 90 mol % or less, more preferably 85 mol % or less. Also, the ratio of the pentamethylene diisocyanate is, for example, 5 mol % or more, preferably 10 mol % or more, more preferably 15 mol % or more, and, for example, 40 mol % or less, preferably 30 mol % or less, more preferably 25 mol % or less.

When the ratio of the xylylene diisocyanate and the pentamethylene diisocyanate is within the above-described range, the polyurethane resin (described later) having excellent appearance, durability (weather resistance, chemical resistance), and curing properties (fast curing properties) can be obtained with excellent productivity.

Furthermore, a known additive can be also blended to the polyisocyanate composition at an appropriate ratio as needed. Examples thereof include storage stabilizers (o-toluenesulfonamide, p-toluenesulfonamide, or the like), plasticizers, blocking inhibitors, heat-resistant stabilizers, light-resistant stabilizers, antioxidants, release agents, catalysts, pigments, dyes, lubricants, fillers, and hydrolysis inhibitors.

The additive can be, for example, blended in at least any one of the modified product of the xylylene diisocyanate, the modified product of the pentamethylene diisocyanate, and the modified product of the xylylene diisocyanate and the pentamethylene diisocyanate, or a mixture thereof.

The polyisocyanate composition does not contain a solvent, and can be diluted with an organic solvent as needed.

Examples of the organic solvent include ketones such as acetone, methyl ethyl ketone, methyl isobutyl ketone, and cyclohexanone; nitriles such as acetonitrile, alkyl esters such as methyl acetate, ethyl acetate, butyl acetate, and isobutyl acetate; aliphatic hydrocarbons such as n-hexane, n-heptane, and octane; alicyclic hydrocarbons such as cyclohexane and methyl cyclohexane; aromatic hydrocarbons such as toluene, xylene, and ethyl benzene; glycol ether esters such as methyl cellosolve acetate, ethyl cellosolve acetate, methyl carbitol acetate, ethyl carbitol acetate, ethylene glycol ethyl ether acetate, propylene glycol methyl ether acetate, 3-methyl-3-methoxybutylacetate, and ethyl-3-ethoxypropionate; ethers such as diethyl ether, tetrahydrofuran, and dioxane; halogenated aliphatic hydrocarbons such as methyl chloride, methylene chloride, chloroform, carbon tetrachloride, methyl bromide, methylene iodide, and dichloroethane; and aprotic polar solvents such as N-methyl pyrrolidone, dimethyl formamide, N,N'-dimethylacetamide, dimethyl sulfoxide, and hexamethylphosphonylamide.

Furthermore, examples of the organic solvent include non-polar solvents (non-polar organic solvents). Examples of the non-polar solvents include non-polar organic solvents having an aniline point of, for example, 10 to 70° C., preferably 12 to 65° C. with low toxic and weak solubility, including aliphatic and naphthene-type hydrocarbonic organic solvents and vegetable oils represented by terpene oil.

The non-polar organic solvent can be available as a commercially available product. Examples of the commercially available product thereof include petroleum hydrocarbonate organic solvents such as HAWS (manufactured by Shell Chemicals Japan, aniline point of 15° C.), SWAZOLE 310 (manufactured by Maruzen Petrochemical Co., Ltd., aniline point of 16° C.), ESSO NAPHTHA No. 6 (manufactured by Exxon Chemical, Co., Ltd., aniline point of 43° C.), LAWS (manufactured by Shell Chemicals Japan, aniline point of 43° C.), ESSO NAPHTHA No. 5 (manufactured by Exxon Chemical, Co., Ltd., aniline point of 55° C.), and PEGASOL 3040 (manufactured by Mobil Oil Corporation, aniline point of 55° C.); and in addition, terpene oils such as methyl cyclohexane (aniline point of 40° C.), ethylcyclohexane (aniline point of 44° C.), and GUM TURPENTINE N (manufactured by YASUHARA CHEMICAL CO., LTD., aniline point of 27° C.).

The polyisocyanate composition can be mixed with these organic solvents at an arbitrary ratio.

When the polyisocyanate composition is diluted with the organic solvent, for example, the organic solvent may be blended into both or any one of the isocyanurate derivative of the xylylene diisocyanate and the derivative of the aliphatic polyisocyanate in advance; may be blended at the time of blending of the isocyanurate derivative of the xylylene diisocyanate and the derivative of the aliphatic polyisocyanate; and furthermore, may be separately blended into the polyisocyanate composition that is obtained after blending the isocyanurate derivative of the xylylene diisocyanate and the derivative of the aliphatic polyisocyanate.

When the polyisocyanate composition is diluted with the organic solvent, the concentration of the polyisocyanate composition is, for example, 20 mass % or more, preferably 30 mass % or more, and for example, 95 mass % or less, preferably 90 mass % or less.

In this case, the viscosity at 25° C. thereof is adjusted to, for example, 10 mPa·s or more, preferably 20 mPa·s or more, and for example, 10000 mPa·s or less, preferably 5000 mPa·s or less.

According to the polyisocyanate composition, the polyurethane resin having excellent appearance, durability (weather resistance, chemical resistance), and curing properties (fast curing properties) can be obtained with excellent productivity.

Thus, the polyisocyanate composition is preferably used in the production of the polyurethane resin.

The polyurethane resin can be obtained by allowing the above-described polyisocyanate composition to react with an active hydrogen group-containing compound.

In the present invention, the active hydrogen group-containing compound is, for example, an organic compound having one or more of active hydrogen group(s) such as hydrogen group, mercapto group, and amino group in its molecule.

Examples of the active hydrogen group-containing compound include monool components, polyol components, monothiol components, polythiol components, monoamine components, and polyamine components. Preferably, monool components and polyol components are used, more preferably, polyol components are used.

In the present invention, an example of the monool component includes a compound having one hydroxyl group and having a number average molecular weight of below 300, preferably below 400. To be specific, examples thereof include aliphatic monoalcohols such as methanol, ethanol, propanol, n-butanol, and isobutanol and hydroxyl group-containing unsaturated compounds such as hydroxyethyl (meth)acrylate, hydroxypropyl (meth)acrylate, trimethylolpropane tri(meth)acrylate, pentaerythritol tri(meth)acrylate, and dipentaerythritol penta(meth) acrylate.

In the present invention, examples of the polyol component include low molecular weight polyols and high molecular weight polyols.

The low molecular weight polyol is a compound having two or more hydroxyl groups and having a number average molecular weight of below 300, preferably below 400. Examples thereof include dihydric alcohols such as ethylene glycol, propylene glycol, 1,3-propanediol, 1,4-butylene glycol, 1,3-butylene glycol, 1,2-butylene glycol, 1,5-pentanediol, 1,6-hexanediol, neopentyl glycol, 3-methyl-1,5-pentanediol, 2,2,2-trimethylpentanediol, 3,3-dimethylolheptane, alkane (C7 to 20) diol, 1,3- or 1,4-cyclohexanedimethanol and a mixture thereof, 1,3- or 1,4-cyclohexanediol and a mixture thereof, hydrogenated bisphenol A, 1,4-dihydroxy-2-butene, 2,6-dimethyl-1-octene-3,8-diol, bisphenol A, diethylene glycol, triethylene glycol, and dipropylene glycol; trihydric alcohols such as glycerin, trimethylol propane, and triisopropanolamine; tetrahydric alcohols such as tetramethylolmethane (pentaerythritol) and diglycerin; pentahydric alcohols such as xylitol; hexahydric alcohols such as sorbitol, mannitol, allitol, iditol, dulcitol, altritol, inositol, and dipentaerythritol; heptahydric alcohols such as perseitol; and octahydric alcohols such as sucrose.

These low molecular weight polyols can be used alone or in combination of two or more.

The high molecular weight polyol is a compound having two or more hydroxyl groups and having a number average molecular weight of 300 or more, preferably 400 or more, further more preferably 500 or more. Examples thereof include polyether polyol (for example, polyoxyalkylene polyol, polytetramethylene ether polyol, or the like), polyester polyol (for example, polyester adipate polyol, polyester phthalate polyol, lactone polyester polyol, or the like), polycarbonate polyol, polyurethane polyol (for example, polyol obtained by urethane-modifying polyether polyol, polyester polyol, and polycarbonate polyol with polyisocyanate), epoxy polyol, vegetable oil polyol, polyolefin polyol, acrylic polyol, and vinyl monomer-modified polyol.

These high molecular weight polyols can be used alone or in combination of two or more.

As the high molecular weight polyol, preferably, acrylic polyol is used.

The polyurethane resin can be, for example, produced by a polymerization method such as bulk polymerization and solution polymerization.

In the bulk polymerization, for example, the polyisocyanate composition is stirred under a nitrogen gas stream, and the active hydrogen group-containing compound is added thereto to react at a reaction temperature of 50 to 250° C., further more preferably 50 to 200° C. for 0.5 to 15 hours.

In the solution polymerization, the polyisocyanate composition and the active hydrogen group-containing compound are added to the organic solvent illustrated as the organic solvent used in the dilution of the polyisocyanate composition to react at a reaction temperature of 50 to 120° C., preferably 50 to 100° C. for 0.5 to 15 hours.

Furthermore, in the above-described polymerization reaction, for example, the above-described urethane-formation catalyst may be added as needed.

In the bulk polymerization and the solution polymerization, for example, the polyisocyanate composition and the active hydrogen group-containing compound are blended so that the equivalent ratio (NCO/active hydrogen group) of the isocyanate group in the polyisocyanate composition with respect to the active hydrogen group (hydroxyl group, mercapto group, and amino group) in the active hydrogen group-containing compound is, for example, 0.75 to 1.3, preferably 0.9 to 1.1.

When the above-described polymerization reaction is performed more industrially, the polyurethane resin can be obtained by a known method such as one shot method and prepolymer method.

In the one shot method, for example, the polyisocyanate composition and the active hydrogen group-containing compound are formulated (mixed) so that the equivalent ratio (NCO/active hydrogen group) of the isocyanate group in the polyisocyanate composition with respect to the active hydrogen group (hydroxyl group, mercapto group, and amino group) in the active hydrogen group-containing compound is, for example, 0.75 to 1.3, preferably 0.9 to 1.1 to be then subjected to curing reaction at, for example, room temperature to 250° C., preferably room temperature to 200° C. for, for example, 5 minutes to 72 hours, preferably 4 to 24 hours. The curing temperature may be fixed, or can be gradually increased or cooled.

In the prepolymer method, for example, first, the polyisocyanate composition reacts with a part (preferably, high molecular weight polyol) of the active hydrogen group-containing compound, thereby synthesizing an isocyanate group-terminated prepolymer having an isocyanate group at the end of its molecule. Next, the obtained isocyanate group-terminated prepolymer reacts with a remaining portion (preferably, low molecular weight polyol and/or polyamine component) of the active hydrogen group-containing compound to be subjected to a chain extension reaction. In the prepolymer method, the remaining portion of the active hydrogen group-containing compound can be used as a chain extension agent.

To synthesize the isocyanate group-terminated prepolymer, the polyisocyanate composition and a part of the active hydrogen group-containing compound are formulated (mixed) so that the equivalent ratio (NCO/active hydrogen group) of the isocyanate group in the polyisocyanate composition with respect to the active hydrogen group in a part of the active hydrogen group-containing compound is, for example, 1.1 to 20, preferably 1.3 to 10, further more preferably 1.3 to 6 to then react in a reaction vessel at, for example, room temperature to 150° C., preferably 50 to 120° C., for, for example, 0.5 to 18 hours, preferably 2 to 10 hours. In the reaction, the above-described urethane-formation catalyst may be added as needed, or after the completion of the reaction, the unreacted polyisocyanate composition can be removed by, for example, a known removing method such as distillation and extraction as needed.

Next, to react the obtained isocyanate group-terminated prepolymer with the remaining portion of the active hydrogen group-containing compound, the isocyanate group-terminated prepolymer and the remaining portion of the active hydrogen group-containing compound are formulated (mixed) so that the equivalent ratio (NCO/active hydrogen group) of the isocyanate group in the isocyanate group-terminated prepolymer with respect to the active hydrogen group in the remaining portion of the active hydrogen group-containing compound is, for example, 0.75 to 1.3, preferably 0.9 to 1.1 to be then subjected to curing reaction at, for example, room temperature to 250° C., preferably room temperature to 200° C. for, for example, 5 minutes to 72 hours, preferably 1 to 24 hours.

In this manner, the polyurethane resin can be obtained.

When the polyurethane resin is produced, furthermore, a known additive can be added at an appropriate ratio as needed. Examples thereof include plasticizers, blocking inhibitors, heat-resistant stabilizers, light-resistant stabilizers, antioxidants, release agents, catalysts, moreover, pigments, dyes, lubricants, fillers, and hydrolysis inhibitors. These additives may be added at the time of synthesis of each of the components, at the time of mixing and dissolution of each of the components, and furthermore, after the synthesis.

The polyurethane resin is produced by using the polyisocyanate composition of the present invention, so that it can be obtained with excellent productivity and has excellent appearance, durability (weather resistance, chemical resistance), and curing properties (fast curing properties).

Thus, the polyisocyanate composition and the polyurethane resin described above can be used in various industrial fields.

To be specific, the polyurethane resin and the polyisocyanate composition described above can be preferably used as two-component curable polyurethane and a curing agent thereof such as coatings, adhesives for industrial purposes, adhesives for packing, hot melt adhesives, pressure-sensitive adhesives, overprint varnish (OP varnish), ink, sealant, and binder resins.

To be more specific, when the polyurethane resin and the polyisocyanate composition described above are used as the coatings, examples thereof include coatings for plastic, coatings for car exterior, coatings for car interior, coatings for electric and electronic material, coatings for optical material (lens or the like), coatings for building material, glass coatings, wood coatings, film coatings, ink coatings, artificial leather coatings (coating agent), and can coatings (coating agent).

Examples of the above-described coatings for plastic include coatings for casing (cell phone, smart phone, personal computer, tablet, or the like), coatings for car component (car interior material, headlamp, or the like), coatings for household electric appliance, coatings for robot material, coatings for furniture, coatings for stationery, coatings for eyewear material (lens or the like), coatings for sport member (golf ball or the like), coatings for band (watch band or the like), and coatings for optical lens of electronic device (surface coating agent).

Examples of the above-described coatings for car exterior include coatings for new car, coatings for automobile repair, and coatings for exterior component (aluminum wheel, bumper, or the like).

Examples of the above-described film coatings include coatings for optical member (optical film, optical sheet, or the like), optical coating material, coatings for fiber, coatings for electronic and electric material, coatings for food packaging, coatings for medical film, coatings for cosmetic packaging, coatings for decorative film, and coatings for release film.

The polyurethane resin and the polyisocyanate composition described above can be used as the coatings and in addition, preferably used in the fields such as adhesive, ink resin, aqueous resin, thermosetting resin, optical resin (lens or the like), active energy curable resin, and foam resin (flexible foam, rigid foam, or the like).

Examples of the adhesives include adhesives for food packaging, adhesives for household refill packaging, adhesives for electric device, adhesives for liquid crystal display (LCD), adhesives for EL display, adhesives for EL illumination, adhesives for display device (electronic paper, plasma display, or the like), automobile adhesives, adhesives for household electric appliance, adhesives for solar cell back sheet, adhesives for various cells (lithium ion cell or the like), and moisture curable adhesives.

Examples of the above-described ink resin include vehicle of various ink (press ink, screen ink, flexographic ink, gravure ink, jet ink, or the like).

Furthermore, the polyurethane resin can be, for example, widely used in a wide range of fields such as pressure-sensitive adhesive, various microcapsules, plastic lens, artificial and synthetic leather, RIM molded article, slush powder, elastic molded article (spandex), flexible gel, robot material, mobility material, health care material, and a substrate resin of carbon fiber reinforcement plastic (CFRP).

The present invention includes the two-component curable polyurethane composition.

The two-component curable polyurethane composition contains a polyisocyanate component that is prepared as a curing agent and a polyol component that is prepared as a base component.

The polyisocyanate component (curing agent) contains the above-described polyisocyanate composition, and preferably consists of the above-described polyisocyanate composition.

The polyisocyanate component (curing agent) can contain the above-described organic solvent as needed.

When the polyisocyanate component (curing agent) contains the organic solvent, the content ratio thereof is not particularly limited, and appropriately set in accordance with its purpose and usages.

An example of the polyol component (base component) includes the above-described polyol component. These polyol components can be used alone or in combination of two or more. As the polyol component, preferably, high molecular weight polyol is used, more preferably, acrylic polyol is used.

The polyol component (base component) can contain the above-described organic solvent as needed.

When the polyol component (base component) contains the organic solvent, the content ratio thereof is not particularly limited, and appropriately set in accordance with its purpose and usages.

In the two-component curable polyurethane composition, the polyisocyanate component (curing agent) and the polyol component (base component) are separately prepared, and used by being blended and mixed at the time of its use.

The mixing ratio of the polyisocyanate component (curing agent) and the polyol component (base component) is adjusted so that the equivalent ratio (OH/NCO) of the hydroxyl group in the polyol component (base component) with respect to the isocyanate group in the polyisocyanate component (curing agent) is, for example, 0.5 or more, preferably 0.75 or more, and for example, 2 or less, preferably 1.5 or less.

Also, for example, an additive may be blended into any one or both of the polyisocyanate component (curing agent) and the polyol component (base component) as needed. Examples of the additive include epoxy resin, catalysts, coating improvers, leveling agents, defoaming agents, and stabilizers such as antioxidant and ultraviolet absorber. Examples thereof also include plasticizers, surfactants, pigments (for example, titanium oxide or the like), fillers, organic or inorganic fine particles, fungicide, and silane coupling agents. The mixing amount of the additive is appropriately determined in accordance with its purpose and usages.

The two-component curable polyurethane composition is obtained by using the polyisocyanate composition of the present invention, so that it can be obtained with excellent productivity and has excellent appearance, durability (weather resistance, chemical resistance), and curing properties (fast curing properties).

Thus, the two-component curable polyurethane composition is preferably used in various fields such as coatings (coatings for plastic, coatings for car), coating material, adhesive material, pressure-sensitive adhesive material, ink, and sealant.

The coating material obtained by using the polyisocyanate composition of the present invention can be obtained with excellent productivity and has excellent appearance, durability (weather resistance, chemical resistance), and curing properties (fast curing properties).

Thus, among all, the above-described coating materials are preferably used in plastic coatings, glass coatings, or the like.

EXAMPLES

Next, the present invention is described based on Production Examples, Examples, and Comparative Examples. The present invention is however not limited by the following Examples. All designations of "part" or "parts" and "%" mean part or parts by mass and % by mass, respectively, unless otherwise particularly specified in the following description. The specific numerical values in mixing ratio (content ratio), property value, and parameter used in the following description can be replaced with upper limit values (numerical values defined as "or less" or "below") or lower limit values (numerical values defined as "or more" or "above") of corresponding numerical values in mixing ratio (content ratio), property value, and parameter described in the above-described "DESCRIPTION OF EMBODIMENTS".

Various measurement methods are described in the following.

<Concentration of Isocyanate Monomer (Unit: Mass %)>

The concentration of an unreacted isocyanate monomer (pentamethylene diisocyanate, xylylene diisocyanate) in a polyurethane resin material was calculated by the calibration curve obtained from the area value of the chromatogram obtained under the following HPLC analysis conditions by using pentamethylene diisocyanate obtained in Production Example 1 to be described later, or commercially available xylylene diisocyanate as a standard sample.

Device: Prominence (manufactured by Shimadzu Corporation)
1) Pump LC-20AT
2) Degasser DGU-20A3
3) Auto-sampler SIL-20A
4) Column thermostatic chamber COT-20A
5) Detector SPD-20A
Column: SHISEIDO SILICA SG-120
Column temperature: 40° C.
Eluent: n-hexane/methanol/1,2-dichloroethane=90/5/5 (volume ratio)
Flow rate: 0.2 mL/min
Detection method: UV 225 nm <Conversion Rate of Isocyanate Group (Unit: %)>

The ratio of the area of the peak at the high molecular weight side with respect to the used isocyanate monomer peak relative to the total peak area was defined as the conversion rate of the isocyanate group based on the chromatogram obtained under the following GPC measurement conditions.

Device: HLC-8020 (manufactured by TOSOH CORPORATION)
Column: G1000HXL, G2000HXL, and G3000HXL (hereinabove, manufactured by TOSOH CORPORATION, trade name) connected in series
Column temperature: 40° C.
Eluent: tetrahydrofuran
Flow rate: 0.8 mL/min
Detection method: differential refractive index and UV (wavelength of 264 nm) absorption
Standard sample: polyethylene oxide (manufactured by TOSOH CORPORATION, trade name: TSK standard polyethylene oxide)

<Concentration of Isocyanate Group (Unit: Mass %)>

The concentration of the isocyanate group was measured by using a potentiometric titrator by a toluene/dibutyl amine-hydrochloric acid method in conformity with JIS K-1603-1 (2007).

<Distillation Yield of Isocyanurate Derivative>

The distillation yield of the isocyanurate derivative was obtained by measuring the mass of the reaction mixture (liquid before distillation) and that of the isocyanurate derivative (liquid after distillation), and calculating the ratio of the mass of the isocyanurate derivative with respect to the mass of the reaction mixture by the following formula.

Distillation yield of isocyanurate derivative (mass %)=(mass(g) of isocyanurate derivative/mass(g) of reaction mixture)×100

<Modification Amount (Alcohol Modification Rate of Isocyanurate Derivative) of Alcohols with Respect to Isocyanurate Derivative>

The modification amount (alcohol modification rate in the reaction mixture) of the alcohols in the reaction mixture was calculated as the charged mass of the alcohols with respect to the charged mass of the material isocyanate monomer (xylylene diisocyanate and/or pentamethylene diisocyanate).

The modification amount (alcohol modification rate of the isocyanurate derivative) of the alcohols with respect to the isocyanurate derivative was calculated by the following formula.

Alcohol Modification Rate (mass %) of Isocyanurate Derivative=(Alcohol Modification Rate (mass %) in Reaction Mixture/Distillation Yield (mass %))×100

<Conversion Rate (Reaction Rate) (%)>

The concentration of the isocyanate group in the reaction liquid (reaction mixture or isocyanurate derivative) was measured in conformity with JIS K-1603-1 (2010), and by obtaining the decreasing rate thereof, the conversion rate (reaction rate) of the isocyanate group was obtained.

When the isocyanurate derivative was not essentially modified with the alcohols, the conversion rate of the isocyanate group was the isocyanurate conversion rate (trimer conversion rate).

When the isocyanurate derivative of the xylylene diisocyanate was modified with the alcohols, the conversion rate of the isocyanate group after addition of the alcohols and before addition of the isocyanurate-formation catalyst was the urethane conversion rate. The conversion rate of the isocyanate group after addition of the isocyanurate-formation catalyst was the isocyanurate conversion rate (trimer conversion rate).

<Analysis of Concentration of Pentamethylene Diisocyanate in Modified Product of Xylylene Diisocyanate and Pentamethylene Diisocyanate>

After the reaction mixture was distilled by the thin-film distillation, the obtained low-boiling point component (unreacted isocyanate monomer) was subjected to GCMS analysis under the following conditions, and the ratio of the unreacted monomer in the low-boiling point component was measured.

The ratio of the pentamethylene diisocyanate in the modified product was calculated from the obtained ratio, the distillation yield, and the charged ratio of the reaction liquid.

Device: GCMS7980 (Agilent)

Column: Agilent VF-5 ms, 30 m, φ 0.25 mm, film thickness 0.25 μm

Oven conditions: column temperature 40° C. (4 min)-10° C./min-250° C. (5 min)

Injection temperature: 250° C.

Injection amount: 1 μl (10% dichloromethane solution), split ratio 1/30

He flow: 2.374 ml/min (40° C.)

FID/MSD split ratio=1/2

Production Example 1 (Production of Pentamethylene Diisocyanate (a))

1,5-pentamethylene diisocyanate (hereinafter, may be abbreviated as PDI) (99.9 mass %) was obtained in the same manner as Example 1 in the description of the International Patent WO 2012/121291.

To be more specific, 2000 parts by mass of o-dichlorobenzene was charged into a jacketed pressure reaction vessel equipped with an electromagnetic induction stirrer, an automatic pressure control valve, a thermometer, a nitrogen inlet line, a phosgene inlet line, a condenser, and a material feed pump. Next, 2300 parts by mass of phosgene was added from the phosgene inlet line to start the stirring. Cold water was allowed to pass the jacket of the reaction vessel, and the internal temperature was kept about 10° C. Then, a solution obtained by dissolving 400 parts by mass of the pentamethylene diamine (a) in 2600 parts by mass of the o-dichlorobenzene was fed with the feed pump for 60 minutes, and the cold phosgenation was started at 30° C. or less under a normal pressure. After the completion of the feeding, the inside of the pressure reaction vessel became pale brownish white slurry.

Next, a pressure was applied until 0.25 MPa, and furthermore, thermal phosgenation was performed at a pressure of 0.25 MPa at a reaction temperature of 160° C. for 90 minutes, while the temperature of the internal liquid in the reaction vessel was gradually increased to 160° C. In the middle of the thermal phosgenation, 1100 parts by mass of the phosgene was further added. In the process of the thermal phosgenation, the internal liquid in the pressure reaction vessel became a pale brownish clear solution. After the completion of the thermal phosgenation, nitrogen gas was allowed to pass at 100 to 140° C. at 100 L/hour, and degassing was performed.

Next, after the o-dichlorobenzene was distilled off under a reduced pressure, the pentamethylene diisocyanate was distilled off under the same reduced pressure, so that 558 parts by mass of the pentamethylene diisocyanate $(a_0)$ having the purity of 98.7% was obtained.

Next, 558 parts by mass of the pentamethylene diisocyanate $(a_0)$ and 0.02 parts by mass of tris(tridecyl) phosphite (manufactured by JOHOKU CHEMICAL CO., LTD., trade name: JP-333E) with respect to 100 parts by mass of the pentamethylene diisocyanate were charged into a four-neck flask equipped with a stirrer, a thermometer, a reflux tube, and a nitrogen inlet tube to be subjected to heat treatment under a normal pressure at 190° C. for two hours, while the nitrogen was introduced thereto, so that 553 parts by mass of pentamethylene diisocyanate $(a_1)$ having the purity of 98.2% was obtained. The yield of the pentamethylene diisocyanate in the heat treatment was 99.4%.

Next, the pentamethylene diisocyanate $(a_1)$ after the heat treatment was charged into a glass-made flask and refined, while being further refluxed, under the conditions of 127 to 132° C. at 2.7 KPa by using a rectification device equipped with a distillation column (manufactured by SHIBATA SCIENTIFIC TECHNOLOGY LTD., trade name: Distilling Column K) equipped with a distillation tube filled with 4 elements of packings (manufactured by Sumitomo Heavy Industries, Ltd., trade name: Sumitomo/Sulzer laboratory packing EX) and a reflux ratio adjusting timer, and a cooler, so that a fraction having a distillation rate of 20 to 80% was collected to obtain pentamethylene diisocyanate (a). The concentration of the hydrolyzable chlorine (HC) of the pentamethylene diisocyanate (a) was 70 ppm.

Production Example 2 (Modified Product A of Pentamethylene Diisocyanate)

The pentamethylene diisocyanate (a) obtained in Production Example 1 (500 parts by mass), 1 part by mass of isobutyl alcohol, 0.3 parts by mass of 2,6-di(tert-butyl)-4-methylphenol, and 0.52 parts by mass of tridecyl phosphite (aliphatic organic phosphite, manufactured by JOHOKU CHEMICAL CO., LTD., trade name: JP-310) (hereinafter, the same) were charged into a four-neck flask equipped with a stirrer, a thermometer, a reflux tube, and a nitrogen inlet tube to then react at 80° C. for 2 hours.

Next, the reaction liquid was cooled to 45° C., and thereafter, 0.05 parts by mass of N-(2-hydroxypropyl)-N,N,N-trimethylammonium-2-ethylhexanoate (manufactured by Air Products and Chemicals, Inc., trade name: DABCO (r) TMR) as the isocyanurate-formation catalyst was added thereto.

Furthermore, the resulting liquid was allowed to react for 15 minutes, and thereafter, 0.12 parts by mass of the o-toluenesulfonamide was added thereto at 95° C. The obtained reaction liquid was allowed to pass a thin-film distillation device to be distilled at the vacuum of 0.09 KPa and a temperature of 150° C., so that 401 parts by mass of unreacted pentamethylene diisocyanate was obtained.

Furthermore, 0.02 parts by mass of the o-toluenesulfonamide was added to 100 parts by mass of the obtained high boiling-side composition (remaining portion after removing the unreacted pentamethylene diisocyanate), so that 100 parts by mass of the modified product A of the pentamethylene diisocyanate (isocyanurate derivative of pentamethylene diisocyanate) was obtained.

In the modified product A of the pentamethylene diisocyanate, the concentration of the unreacted 1,5-pentamethylene diisocyanate was below 1 mass % and the concentration of the isocyanate group was 25 mass %.

Production Example 3 (Modified Product B of Xylylene Diisocyanate)

Under a nitrogen atmosphere, 100 parts by mass of 1,3-xylylene diisocyanate (manufactured by Mitsui Chemicals, Inc., m-XDI), 0.025 phr of 2,6-di(tert-butyl)-4-methylphenol (also known as: dibutylhydroxytoluene, BHT, hindered phenol antioxidant), and 0.05 phr of tetraphenyl.dipropyleneglycol.diphosphite (JPP-100 (trade name, manufactured by JOHOKU CHEMICAL CO., LTD.), organic phosphite, auxiliary catalyst) were charged into a reaction vessel equipped with a thermometer, a stirrer, a nitrogen inlet tube, and a cooling tube and thereafter, as the isocyanurate-formation catalyst, 0.056 phr (solid content conversion of 0.021 phr) of the solution (37% methanol solution) of the hydroxide of the tetrabutylammonium (TBAOH) was blended into the charged liquid to react at the reaction start temperature of 60° C. for 400 minutes. The maximum achieving temperature during the reaction was 72° C.

The obtained reaction mixture was allowed to pass a thin-film distillation device (temperature of 150° C., vacuum of 50 Pa), and the unreacted xylylene diisocyanate was removed, so that the modified product (isocyanurate derivative of the xylylene diisocyanate) B of the xylylene diisocyanate was obtained. The distillation yield was 57.4 mass %.

In the isocyanurate derivative (after distillation), the alcohol modification rate in the reaction was 0 mass % and the isocyanurate conversion rate (trimer conversion rate) was 30.1 mass %.

Production Example 4 (Modified Product C of Xylylene Diisocyanate)

Under a nitrogen atmosphere, 100 parts by mass of 1,3-xylylene diisocyanate (manufactured by Mitsui Chemicals, Inc., m-XDI), 0.025 phr of 2,6-di(tert-butyl)-4-methylphenol (also known as: dibutylhydroxytoluene, BHT, hindered phenol antioxidant), and 0.05 phr of tetraphenyl.dipropyleneglycol.diphosphite (JPP-100 (trade name, manufactured by JOHOKU CHEMICAL CO., LTD.), organic phosphite, auxiliary catalyst) were charged into a reaction vessel equipped with a thermometer, a stirrer, a nitrogen inlet tube, and a cooling tube, and thereafter, 1.96 parts by mass of 1,3-butanediol was added to the obtained charged liquid. The temperature of the charged liquid was increased to 75° C. to be subjected to urethane-formation reaction. The equivalent ratio (NCO/OH) of the isocyanate group of the 1,3-xylylenediisocyanate with respect to the hydroxy group of the 1,3-butanediol was 24.

Next, the resulting product was allowed to react at the same temperature for 120 minutes, and the temperature thereof was decreased to 60° C. Then, as the isocyanurate-formation catalyst, 0.04 phr (solid content conversion of 0.015 phr) of the solution (37% methanol solution) of the hydroxide of the tetrabutylammonium (TBAOH) was blended thereto to be subjected to isocyanurate-formation reaction. The isocyanurate-formation reaction was stopped in 420 minutes after the start of the reaction. The maximum achieving temperature during the reaction was 72° C.

The obtained reaction mixture was allowed to pass a thin-film distillation device (temperature of 150° C., vacuum of 50 Pa), and the unreacted xylylene diisocyanate was removed, so that the modified product (isocyanurate derivative of the xylylene diisocyanate) C of the xylylene diisocyanate was obtained. The distillation yield was 62 mass %.

In the isocyanurate derivative (after distillation), the alcohol modification rate in the reaction was 3.2 mass % and the isocyanurate conversion rate (trimer conversion rate) was 23.3 mass %.

Production Examples 5 to 15 (Modified Products D to M of Xylylene Diisocyanate)

Modified products D to M of the xylylene diisocyanate were obtained in the same manner as Production Example 4, except that the conditions were changed to those shown in Table 1. The distillation yield and the isocyanurate conversion rate (trimer conversion rate) in Production Examples were shown in Table 1.

Production Example 16 (Modified Product N of Xylylene Diisocyanate and Pentamethylene Diisocyanate)

Under a nitrogen atmosphere, 224 parts by mass of 1,3-xylylene diisocyanate (manufactured by Mitsui Chemicals, Inc., m-XDI), 276 parts by mass of the pentamethylene diisocyanate (a) obtained in Production Example 1, 5.9 parts by mass of isobutyl alcohol, 0.025 phr of 2,6-di(tert-butyl)-4-methylphenol (also known as: dibutylhydroxytoluene, BHT, hindered phenol antioxidant), and 0.05 parts by mass of tetraphenyl.dipropyleneglycol.diphosphite (JPP-100 (trade name, manufactured by JOHOKU CHEMICAL CO., LTD.), organic phosphite, auxiliary catalyst) were charged into a reaction vessel equipped with a thermometer, a stirrer, a nitrogen inlet tube, and a cooling tube. The temperature of the charged liquid was increased to 75° C. to react for 120 minutes.

Then, as the isocyanurate-formation catalyst, 0.013 parts by mass (solid content conversion of 0.005 parts by mass) of the solution (37% methanol solution) of the hydroxide of the tetrabutylammonium (TBAOH) was blended thereto to be subjected to isocyanurate-formation reaction. The isocyanurate-formation reaction was stopped in 180 minutes after the start of the reaction. The maximum achieving temperature during the reaction was 80° C.

The obtained reaction mixture was allowed to pass a thin-film distillation device (temperature of 150° C., vacuum of 50 Pa), and the unreacted xylylene diisocyanate and the unreacted 1,5-pentamethylene diisocyanate were removed, so that the modified product (isocyanurate derivative of the xylylene diisocyanate and the pentamethylene diisocyanate) N of the xylylene diisocyanate and the pentamethylene diisocyanate was obtained. The distillation yield was 54.3 mass %.

In the reaction, the conversion rate of the isocyanate group was 29.1 mass %, the alcohol modification rate was 2.1 mass %, and the isocyanurate conversion rate (trimer conversion rate) was 29.1 mass %.

In the obtained modified product N, the ratio of the pentamethylene diisocyanate with respect to the total amount of the xylylene diisocyanate and the pentamethylene diisocyanate was 24 mol %.

Production Example 17 (Modified Product O of Xylylene Diisocyanate and Pentamethylene Diisocyanate)

A modified product O of the xylylene diisocyanate and the pentamethylene diisocyanate was obtained in the same manner as Production Example 16, except that the conditions were changed to those shown in Table 2.

Examples 1 to 20 and Comparative Examples 1 to 4 (Preparation of Polyisocyanate Composition and Polyurethane Resin)

Each of the modified products of the pentamethylene diisocyanate obtained in Production Examples or a commercially available Takenate D-170N (isocyanurate derivative of the hexamethylene diisocyanate, manufactured by Mitsui Chemicals, Inc.), and each of the modified products of the xylylene diisocyanate obtained in Production Examples or a commercially available Takenate D-110N (trimethylol propane modified product of the xylylene diisocyanate, manufactured by Mitsui Chemicals, Inc.) were blended at the ratio described in Tables 3 to 4, so that polyisocyanate compositions were prepared.

In tables, the mixing ratio of the above-described components was shown as the ratio of the material isocyanate monomer (xylylene diisocyanate, pentamethylene diisocyanate, and/or hexamethylene diisocyanate).

The modified product of the xylylene diisocyanate and the pentamethylene diisocyanate was used as the polyisocyanate composition.

The polyisocyanate composition was diluted with ethyl acetate, and a solution of the solid content of 75 mass % was prepared. Next, the obtained solution of the polyisocyanate composition and acrylic polyol (OLESTAR Q-666, hydroxyl value of 28.6 mgKOH/g, solid content concentration of 50%, diluent solvent: butyl acetate) were blended so that the equivalent ratio (NCO/OH) of the isocyanate group in the polyisocyanate composition with respect to the hydroxyl group in the acrylic polyol was 1.0.

Next, butyl acetate was added so that the viscosity of the mixed liquid was 30 to 50 mPa·s. Thereafter, DBTDL (dibutyltin dilaurate (IV) (manufactured by Wako Pure Chemical Industries, Ltd.)) as the catalyst was blended so as to have 300 ppm with respect to the solid content of the acrylic polyol to be then stirred at 23° C. for 90 seconds.

Next, the mixed liquid was applied to a standard test plate (type: electrolytic zinc-plated steel plate and glass plate (hereinafter, abbreviated as test plate)) in conformity with JIS G 3313 (2010) to be then allowed to cure at 80° C. for 30 minutes, so that a coated film of the polyurethane resin having a thickness of about 35 μm was obtained.

The obtained polyurethane resin was left to stand indoors at 23° C. at relative humidity of 55% for seven days.

<Evaluation>
<Compatibility>

In Examples and Comparative Examples, each of the polyisocyanate compositions and each of the acrylic polyols were blended to be then left to stand at room temperature for 10 minutes, and the subsequent appearance thereof was visually confirmed.

The reference of the evaluation was described in the following.
5: Transparent
4: Barely cloudy
3: More cloudy than 4
2: More outstandingly cloudy than 3
1: Completely cloudy <Smoothness>

The smoothness in Long Wave mode was evaluated with Wave-scan dual manufactured by BYK-Gardner.

<Curing Properties (Touch Drying Time)>

In Examples and Comparative Examples, each of the polyisocyanate compositions and each of the acrylic polyols were blended to be applied to a standard test plate; thereafter, preliminarily dried at 80° C. for two minutes; and volatilized the solvent.

Thereafter, the surface of the coated film was touched with a finger, and the time until the resin was not stuck to the finger was measured.

<Appearance of Coated Film>

The coated film applied onto the glass substrate was visually evaluated.

The reference of the evaluation was described in the following.
5: Transparent
4: Barely cloudy
3: More cloudy than 4
2: More outstandingly cloudy than 3
1: Completely cloudy <Weather Resistance Test>

QUV test was performed under the following conditions. The E value of the coated film before or after the test was measured with a spectroscopic colorimeter (manufactured by NIPPON DENSHOKU INDUSTRIES Co., LTD.). A difference (ΔE) of the E value before and after the application of ultraviolet rays was calculated, and the degree of discoloration of the coated film was evaluated.

Also, a relationship of the mole ratio of the pentamethylene diisocyanate modified product with ΔE was confirmed from the formulation (Examples 2 to 6 and Comparative Examples 1 to 2) using the modified product C of the xylylene diisocyanate. The results are shown in FIG. 1.

QUV test condition device: Dewpanel light control weather meter (type: FDP, manufactured by Suga Test Instruments Co., Ltd.)

Cycle conditions: Application: Irradiance: 28 W/m$^2$
60° C.×10% RH×four hours→darkening: 50° C.×95% RH×four hours Application time: 240 hours <Chemical Resistance Test (Lactic Acid Resistance Test)>

One drop of 10% lactic acid (lactic acid diluted with water into 10% solution) was dropped (spotted) onto the surface of the coated film to be then left to stand at 80° C. for 24 hours in a thermostatic chamber. Thereafter, the spot was wiped off, and the coated film was visually evaluated.

The reference of the evaluation was described in the following.
5: Trace of spot was not left.
4: Trace of spot was slightly left.
3: Coated film was slightly dissolved.
2: Coated film was dissolved more than in 3.
1: Coated film was dissolved and underlayer was exposed.

TABLE 1

| | | | Production Ex. 3 | Production Ex. 4 | Production Ex. 5 | Production Ex. 6 | Production Ex. 7 | Production Ex. 8 |
|---|---|---|---|---|---|---|---|---|
| Modified Product of XDI | | | B | C | D | E | F | G |
| Mixing of Reaction Liquid | Alcohol Modifier | Type | — | 1,3-BG | 1,3-BG | 1,3-BG | 1,3-BG | 1,3-BG |
| | | parts by mass | — | 1.96 | 0.28 | 1.2 | 3.3 | 4.95 |
| Urethane-Formation Reaction Conditions | R | [NCO]/[OH] | — | 24 | 170 | 39 | 14 | 9.2 |
| | Reaction Temperature | °C. | — | 75 | 75 | 75 | 75 | 75 |
| | Reaction Time | minutes | — | 120 | 60 | 60 | 120 | 120 |
| Isocyanurate-Formation Reaction Conditions | Catalyst | Type | TBAOH | TBAOH | TBAOH | TBAOH | TBAOH | TBAOH |
| | | Addition Amount in Solid Content Conversion (phr) | 0.04 | 0.04 | 0.035 | 0.03 | 0.025 | 0.025 |
| | Reaction Start Temperature | °C. | 60 | 60 | 60 | 60 | 60 | 60 |
| | Maximum Achieving Temperature | °C. | 72 | 71 | 73 | 71 | 68 | 65 |
| | Reaction Time | minutes | 400 | 420 | 540 | 460 | 300 | 250 |
| | Concentration of Isocyanate Group after Isocyanurate-Formation Reaction | mass % | 30.4 | 31.0 | 31.5 | 31.5 | 31.0 | 31.0 |
| | Conversion Rate of Isocyanate Group | % | 30.1 | 30.6 | 29.5 | 29.5 | 29.9 | 29.9 |
| | Isocyanurate Conversion Rate | % | 30.1 | 23.3 | 28.4 | 25.7 | 20.5 | 15.2 |
| | Distillation Yield | % | 55 | 55 | 55 | 55 | 55 | 55 |
| | Alcohol Modification Rate | mass % | 0.0 | 3.2 | 0.5 | 2.2 | 6.0 | 9.0 |

| | | | Production Ex. 9 | Production Ex. 10 | Production Ex. 11 | Production Ex. 12 | Production Ex. 13 | Production Ex. 14 |
|---|---|---|---|---|---|---|---|---|
| Modified Product of XDI | | | H | I | J | K | L | M |
| Mixing of Reaction Liquid | Alcohol Modifier | Type | 1,3-BG | iBA | iBA | 1,3-BG | 1,3-BG | 1,3-BG |
| | | parts by mass | 6.6 | 1.93 | 3.3 | 0.45 | 0.9 | 2.6 |
| Urethane-Formation Reaction Conditions | R | [NCO]/[OH] | 6.8 | 40 | 23 | 105 | 53 | 18 |
| | Reaction Temperature | °C. | 75 | 75 | 75 | 75 | 75 | 75 |
| | Reaction Time | minutes | 120 | 120 | 120 | 60 | 60 | 120 |
| Isocyanurate-Formation Reaction Conditions | Catalyst | Type | TBAOH | TBAOH | TBAOH | TBAOH | TBAOH | TBAOH |
| | | Addition Amount in Solid Content Conversion (phr) | 0.02 | 0.04 | 0.03 | 0.045 | 0.03 | 0.03 |
| | Reaction Start Temperature | °C. | 60 | 60 | 60 | 60 | 60 | 60 |
| | Maximum Achieving Temperature | °C. | 65 | 75 | 70 | 71 | 65 | 65 |
| | Reaction Time | minutes | 210 | 410 | 270 | 500 | 120 | 110 |
| | Concentration of Isocyanate Group after Isocyanurate-Formation Reaction | mass % | 31.0 | 31.0 | 31.0 | 41.0 | 37.5 | 26.0 |
| | Conversion Rate of Isocyanate Group | % | 29.9 | 29.9 | 29.9 | 8.3 | 15.2 | 41.2 |
| | Isocyanurate Conversion Rate | % | 10.0 | 23.5 | 20.6 | 6.3 | 12.9 | 33.7 |

TABLE 1-continued

| | | | | | | | |
|---|---|---|---|---|---|---|---|
| Distillation Yield | % | 55 | 55 | 55 | 13 | 26 | 73 |
| Alcohol Modification Rate | mass % | 12.0 | 3.5 | 6.0 | 3.5 | 3.5 | 3.6 |

TABLE 2

| | | | No. | |
|---|---|---|---|---|
| | | | Production Ex. 15 | Production Ex. 16 |
| Modified Product of XDI·PDI | | | N | O |
| Mixing of Reaction Liquid | PDI | mol % | 60 | 75 |
| | XDI | mol % | 40 | 25 |
| | Mixing Amount of PDI + XDI | parts by mass | 500 | 500 |
| | Alcohol Modifier | Type | iBA | iBA |
| | | parts by mass | 5.9 | 5.9 |
| | | Alcohol Modification Amount (mass %) | 1.16 | 1.17 |
| Urethane-Formation Reaction Conditions | R | [NCO]/[OH] | 75 | 65 |
| | Reaction Temperature | ° C. | 75 | 75 |
| | Reaction Time | minutes | 120 | 120 |
| Isocyanurate-Formation Reaction Conditions | Catalyst | Type | TBAOH | TBAOH |
| | | Addition Amount in Solid Content Conversion (phr) | 0.005 | 0.005 |
| | Reaction Start Temperature | ° C. | 75 | 75 |
| | Maximum Achieving Temperature | ° C. | 80 | 78 |
| | Reaction Time | minutes | 180 | 90 |
| | Concentration of Isocyanate Group at Time of Start of Reaction | mass % | 50.1 | 50.7 |
| | Concentration of Isocyanate Group after Urethane-Formation Reaction | mass % | 48.8 | 50.2 |
| | Concentration of Isocyanate Group after Isocyanurate-Formation Reaction | mass % | 34.2 | 45 |
| | Conversion Rate of Isocyanate Group | % | 31.7 | 11.2 |
| | Urethane Conversion Rate | % | 2.6 | 1.0 |
| | Isocyanurate Conversion Rate | % | 29.1 | 10.3 |
| | Distillation Yield | % | 54.3 | 18.3 |
| | Alcohol Modification Rate | mass % | 2.14 | 6.37 |
| | PDI in Modified Product of XDI·PDI | mol % | 24 | 32 |

TABLE 3

| | | | | | | No. | | | | | | |
|---|---|---|---|---|---|---|---|---|---|---|---|---|
| | | | | | | Ex. 1 | Ex. 2 | Ex. 3 | Ex. 4 | Ex. 5 | Ex. 6 | Ex. 7 |
| Polyisocyanate Composition | XDI Modified Product | Isocyanurate Derivative | Type | | | B | C | C | C | C | C | D |
| | | | Mixing Amount | mol % | | 80 | 93 | 88 | 80 | 70 | 66 | 80 |
| | | | Alcohols (Modifier) | Type | | — | 1,3-BG | 1,3-BG | 1,3-BG | 1,3-BG | 1,3-BG | 1,3-BG |
| | | | Alcohol Modification Rate | mass % | | 0.0 | 3.2 | 3.2 | 3.2 | 3.2 | 3.2 | 0.5 |
| | | | Isocyanurate Conversion Rate | % | | 30.1 | 23.3 | 23.3 | 23.3 | 23.3 | 23.3 | 28.4 |
| | | Polyol Derivative | Mixing Amount | mol % | | — | — | — | — | — | — | — |
| | | | Polyol (Modifier) | Type | | — | — | — | — | — | — | — |
| | PDI Modified Product | Isocyanurate Derivative | Mixing Amount | mol % | | 20 | 7 | 12 | 20 | 30 | 34 | 20 |
| | Modified Product of XDI:PDI | Type Isocyanurate Derivative | Alcohols (Modifier) | Type | | — | — | — | — | — | — | — |
| | | | Alcohol Modification Rate | mass % | | — | — | — | — | — | — | — |
| | | | Isocyanurate Conversion Rate | % | | — | — | — | — | — | — | — |

TABLE 3-continued

|  |  |  |  |  |  |  |  |  |  |  |
|---|---|---|---|---|---|---|---|---|---|---|
|  |  | PDI in Modified Product of XDI:PDI | mol % | — | — | — | — | — | — | — |
| Properties | Compatability with Polyol Component | | Visual Observation | 3 | 4 | 5 | 5 | 5 | 5 | 4 |
|  | Appearance of Coated Film | | Visual Observation | 4 | 4 | 5 | 5 | 5 | 5 | 4 |
|  | Smoothness | | | 27 | 28 | 25 | 23 | 22 | 21 | 25 |
|  | Curing Properties | | Touch Drying (seconds) | 53 | 52 | 53 | 55 | 57 | 60 | 53 |
|  | Light Resistance (Weather Resistance) | | ΔE | 2 | 2.2 | 2.1 | 2.05 | 2 | 2 | 2 |
|  | Chemical Resistance | | 10% Lactic Acid Resistance | 5 | 5 | 5 | 5 | 5 | 3 | 5 |

| | | | | | | No. | | | | |
|---|---|---|---|---|---|---|---|---|---|---|
| | | | | | | Ex. 8 | Ex. 9 | Ex. 10 | Ex. 11 | Ex. 12 |
| Polyisocyanate Composition | XDI Modified Product | Isocyanurate Derivative | Mixing Amount | mol % | | E 80 | F 80 | G 80 | H 80 | I 80 |
| | | | Alcohols (Modifier) | Type | | 1,3-BG | 1,3-BG | 1,3-BG | 1,3-BG | iBA |
| | | | Alcohol Modification Rate | mass % | | 2.2 | 6.0 | 9.0 | 12.0 | 3.5 |
| | | | Isocyanurate Conversion Rate | % | | 25.7 | 20.5 | 15.2 | 10.0 | 23.5 |
| | | Polyol Derivative | Mixing Amount | mol % | | — | — | — | — | — |
| | | | Polyol (Modifier) | Type | | — | — | — | — | — |
| | PDI Modified Product | Isocyanurate Derivative | Mixing Amount | mol % | | 20 | 20 | 20 | 20 | 20 |
| | Modified Product of XDI:PDI | Isocyanurate Derivative | Type | | | | | | | |
| | | | Alcohols (Modifier) | Type | | — | — | — | — | — |
| | | | Alcohol Modification Rate | mass % | | — | — | — | — | — |
| | | | Isocyanurate Conversion Rate | % | | — | — | — | — | — |
| | | | PDI in Modified Product of XDI:PDI | mol % | | — | — | — | — | — |
| Properties | Compatability with Polyol Component | | Visual Observation | | | 5 | 5 | 5 | 5 | 5 |
| | Appearance of Coated Film | | Visual Observation | | | 5 | 5 | 5 | 5 | 5 |
| | Smoothness | | | | | 23 | 22 | 22 | 22 | 19 |
| | Curing Properties | | Touch Drying (seconds) | | | 55 | 57 | 60 | 62 | 58 |
| | Light Resistance (Weather Resistance) | | ΔE | | | 2.1 | 2.1 | 2.2 | 2.4 | 1.9 |
| | Chemical Resistance | | 10% Lactic Acid Resistance | | | 5 | 5 | 4 | 4 | 5 |

TABLE 4

| | | | | | | No. | | | | | | |
|---|---|---|---|---|---|---|---|---|---|---|---|---|
| | | | | | | Ex. 13 | Ex. 14 | Ex. 15 | Ex. 16 | Ex. 17 | Ex. 18 | Ex. 19 |
| Poly-isocyanate Composition | XDI Modified Product | Isocyanurate Derivative | Type | | | J | K | L | M | D-110N | D-110N | — |
| | | | Mixing Amount | mol % | | 80 | 80 | 80 | 80 | | | |
| | | | Alcohols (Modifier) | Type | | iBA | 1,3-BG | 1,3-BG | 1,3-BG | — | — | — |

TABLE 4-continued

|  |  |  |  |  |  |  |  |  |  |  |  |
|---|---|---|---|---|---|---|---|---|---|---|---|
|  |  |  | Alcohol Modification Rate | mass % | 6.0 | 3.5 | 3.5 | 3.6 | — | — | — |
|  |  |  | Isocyanurate Conversion Rate | % | 20.6 | 8.3 | 15.2 | 41.2 | — | — | — |
|  |  | Polyol Derivative | Mixing Amount | mol % | — | — | — | — | 93 | 80 | — |
|  |  |  | Polyol Type (Modifier) |  | — | — | — | — | TMP | TMP | — |
|  | PDI Modified Product | Isocyanurate Derivative | Mixing Amount | mol % | 20 | 20 | 20 | 20 | 7 | 20 | — |
|  | HDI Modified Product (D-170N) | Isocyanurate Derivative | Mixing Amount | mol % | — | — | — | — | — | — | — |
|  | Modified Product of XDI:PDI | | Type |  | — | — | — | — | — | — | N |
|  |  | Isocyanurate Derivative | Alcohols (Modifier) | Type | — | — | — | — | — | — | iBA |
|  |  |  | Alcohol Modification Rate | mass % | — | — | — | — | — | — | 2.1 |
|  |  |  | Isocyanurate Conversion Rate | % | — | — | — | — | — | — | 29.1 |
|  |  |  | PDI in Modified Product of XDI:PDI | mol % | — | — | — | — | — | — | 24 |
| Properties | Compatability with Polyol Component | | | Visual Observation | 5 | 5 | 5 | 4 | 5 | 5 | 5 |
|  | Appearance of Coated Film | | | Visual Observation | 5 | 5 | 5 | 5 | 5 | 5 | 5 |
|  | Smoothness | | | | 19 | 20 | 23 | 28 | 25 | 24 | 22 |
|  | Curing Properties | | | Touch Drying (seconds) | 62 | 58 | 55 | 53 | 65 | 69 | 53 |
|  | Light Resistance (Weather Resistance) | | | ΔE | 2 | 2.2 | 2 | 1.8 | 5.5 | 5 | 1.8 |
|  | Chemical Resistance | | | 10% Lactic Acid Resistance | 4 | 3 | 5 | 5 | 3 | 3 | 5 |

|  |  |  |  |  |  |  | No. | | | | |
|---|---|---|---|---|---|---|---|---|---|---|---|
|  |  |  |  |  |  |  | Ex. 20 | Comp. Ex. 1 | Comp. Ex. 2 | Comp. Ex. 3 | Comp. Ex. 4 |
| | Poly-isocyanate Composition | XDI Modified Product | Isocyanurate Derivative | Type Mixing Amount | | mol % | — | C 100 | C 98 | C 50 | D-110N — |
| | | | | Alcohols (Modifier) | Type | | — | 1,3-BG | 1,3-BG | 1,3-BG | — |
| | | | | Alcohol Modification Rate | mass % | | — | 3.2 | 3.2 | 3.2 | — |
| | | | | Isocyanurate Conversion Rate | % | | — | 23.3 | 23.3 | 23.3 | — |
| | | Polyol Derivative | | Mixing Amount | mol % | | — | — | — | — | 80 |
| | | | | Polyol Type (Modifier) | | | — | — | — | — | TMP |
| | | PDI Modified Product | Isocyanurate Derivative | Mixing Amount | mol % | | — | 0 | 2 | 50 | — |
| | | HDI Modified Product (D-170N) | Isocyanurate Derivative | Mixing Amount | mol % | | — | — | — | — | 20 |
| | | Modified Product of XDI:PDI | | Type | | | O | — | — | — | — |
| | | | Isocyanurate Derivative | Alcohols (Modifier) | Type | | iBA | — | — | — | — |
| | | | | Alcohol Modification Rate | mass % | | 6.4 | — | — | — | — |

TABLE 4-continued

| | | | | | | | |
|---|---|---|---|---|---|---|---|
| | | Isocyanurate Conversion Rate | % | 10.3 | — | — | — | — |
| | | PDI in Modified Product of XDI:PDI | mol % | 32 | — | — | — | — |
| Properties | Compatability with Polyol Component | | Visual Observation | 5 | 3 | 3 | 5 | 5 |
| | Appearance of Coated Film | | Visual Observation | 5 | 3 | 3 | 5 | 5 |
| | Smoothness | | | 25 | 30 | 30 | 20 | 23 |
| | Curing Properties | | Touch Drying (seconds) | 57 | 50 | 50 | 70 | 62 |
| | Light Resistance (Weather Resistance) | | ΔE | 2.2 | 2.7 | 2.6 | 1.9 | 2.2 |
| | Chemical Resistance | | 10% Lactic Acid Resistance | 4 | 5 | 5 | 2 | 4 |

The details of the abbreviations in Tables are shown in the following.

PDI: pentamethylene diisocyanate
XDI: xylylene diisocyanate
TMP: trimethylol propane
D-110N: trimethylol propane modified product of xylylene diisocyanate, content ratio of NCO group: 11.5 mass %, solid content concentration: 75 mass %, solvent: ethyl acetate, viscosity (25° C.): 500 mPa·s, manufactured by Mitsui Chemicals, Inc.
D-170N: Takenate D-170N, isocyanurate derivative of hexamethylene diisocyanate, content ratio of NCO group: 20.7 mass %, solid content concentration: 100 mass %, viscosity (25° C.): 2000 mPa·s, manufactured by Mitsui Chemicals, Inc.

While the illustrative embodiments of the present invention are provided in the above description, such is for illustrative purpose only and it is not to be construed as limiting the scope of the present invention. Modification and variation of the present invention that will be obvious to those skilled in the art is to be covered by the following claims.

INDUSTRIAL APPLICABILITY

The polyisocyanate composition and the polyurethane resin of the present invention are widely used in various fields such as coatings, adhesives for industrial purposes, adhesives for packing, hot melt adhesives, pressure-sensitive adhesives, overprint varnish (OP varnish), ink, sealant, and binder resins.

The invention claimed is:

1. A polyisocyanate composition containing:
   a modified product of xylylene diisocyanate and a modified product of pentamethylene diisocyanate, and/or
   a modified product of the xylylene diisocyanate and the pentamethylene diisocyanate,
   the ratio of the pentamethylene diisocyanate with respect to the total amount of the xylylene diisocyanate and the pentamethylene diisocyanate is 5 mol % or more and 40 mol % or less,
   the modified product of the xylylene diisocyanate contains a trimer,
   in the modified product of the xylylene diisocyanate, the trimer conversion rate of the xylylene diisocyanate is 5 mass % or more and 45 mass % or less,
   the modified product of the xylylene diisocyanate is modified with at least alcohols, and
   an alcohol rate with respect to the total amount of the modified product of the xylylene diisocyanate is 0.1 mass % or more and 10 mass % or less.

2. A polyurethane resin obtained from reaction of the polyisocyanate composition according to claim 1 with an active hydrogen group-containing compound.

3. A two-component curable polyurethane composition containing
   a polyisocyanate component containing the polyisocyanate composition according to claim 1, and
   a polyol component.

4. A coating material obtained from the two-component curable polyurethane composition according to claim 3.

* * * * *